US012647572B2

(12) United States Patent
He et al.

(10) Patent No.: US 12,647,572 B2
(45) Date of Patent: Jun. 2, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Yuwen He, Los Angeles, CA (US); Yang Wang, Beijing (CN); Li Zhang, Los Angeles, CA (US); Kai Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/658,743

(22) Filed: May 8, 2024

(65) Prior Publication Data

US 2024/0323390 A1     Sep. 26, 2024

Related U.S. Application Data

(63) Continuation of application No. PCT/CN2022/130395, filed on Nov. 7, 2022.

(30) Foreign Application Priority Data

Nov. 8, 2021    (WO) ................ PCT/CN2021/129301

(51) Int. Cl.
*H04N 19/139* (2014.01)
*H04N 19/132* (2014.01)
(Continued)

(52) U.S. Cl.
CPC ......... *H04N 19/139* (2014.11); *H04N 19/132* (2014.11); *H04N 19/176* (2014.11); *H04N 19/184* (2014.11); *H04N 19/52* (2014.11)

(58) Field of Classification Search
None
See application file for complete search history.

(56) References Cited

U.S. PATENT DOCUMENTS

2018/0270500 A1*   9/2018   Li ........................... H04N 19/52
2020/0296405 A1    9/2020   Huang et al.
(Continued)

FOREIGN PATENT DOCUMENTS

WO        2021188598 A1    9/2021

OTHER PUBLICATIONS

Hsaio et al., "CE4-related: Overlapped block optical flow", Joint Video Experts Team (JVET) of ITU-T SG 16 WP 3 and ISO/IEC JTC 1/SC 29/WG 11, 16th Meeting: Geneva, CH, Document: JVET-P0153-v2, Oct. 1-11, 2019 (Year: 2019).*
(Continued)

*Primary Examiner* — Lindsay J Uhl
(74) *Attorney, Agent, or Firm* — Astute IP Law Group

(57) ABSTRACT

Embodiments of the present disclosure provide a solution for video processing. A method for video processing is proposed. The method comprises: deriving, during a conversion between a target block of a video and a bitstream of the target block, a sample-based optical flow with an affine motion model for each sub-block associated with the target block; and performing the conversion based on the sample-based optical flow.

18 Claims, 23 Drawing Sheets

2900

2910

DERIVE A SAMPLE-BASED OPTICAL FLOW WITH AN AFFINE MOTION MODEL FOR EACH SUB-BLOCK ASSOCIATED WITH THE TARGET BLOCK

2920

PERFORMING THE CONVERSION BASED ON THE SAMPLE-BASED OPTICAL FLOW

(51) Int. Cl.
    *H04N 19/176*     (2014.01)
    *H04N 19/184*     (2014.01)
    *H04N 19/52*     (2014.01)

(56)            References Cited

U.S. PATENT DOCUMENTS

| | | | |
|---|---|---|---|
| 2020/0304805 A1 | 9/2020 | Li et al. | |
| 2021/0306658 A1 | 9/2021 | Kang et al. | |
| 2022/0078442 A1* | 3/2022 | Chen | H04N 19/172 |
| 2022/0078478 A1* | 3/2022 | Chen | H04N 19/52 |
| 2022/0279165 A1* | 9/2022 | Jang | H04N 19/46 |

OTHER PUBLICATIONS

International Search Report in PCT/CN2022/130395, mailed Feb. 8, 2023, 5 pages.

Hsiao et al., "CE4-related: Overlapped block optical flow", Joint Video Experts Team (JVET) of ITU-T SG 16 WP 3 and ISO/IEC JTC 1/SC 29/WG 11, 16th Meeting: Geneva, CH, Document: JVET-P0153-v2, Oct. 1-11, 2019, 4 pages.

Chuang et al., "CE4-related: PROF prediction sample range reduction", Joint Video Experts Team (JVET) of ITU-T SG 16 WP 3 and ISO/IEC JTC 1/SC 29/WG 11, 16th Meeting: Geneva, CH, Document: JVET-P0154-v4, Oct. 1-11, 2019, 7 pages.

* cited by examiner

4×4 block

6×6 surrounding region samples & gradients padding 810 prediction samples in the extended area 820 prediction samples within the CU

800

910

920

1000

$\vec{v_0}$          $\vec{v_1}$

1100

1200

1300

2100

2200

2300

2400

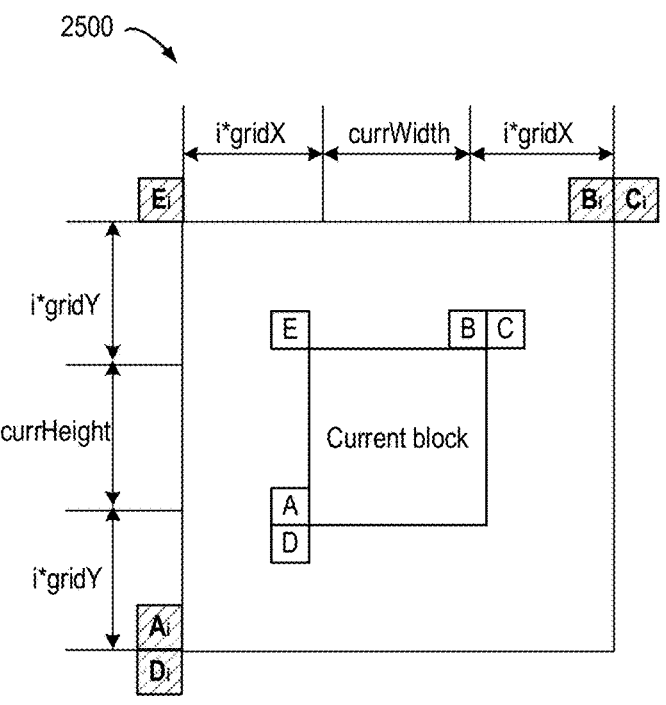
Fig. 25
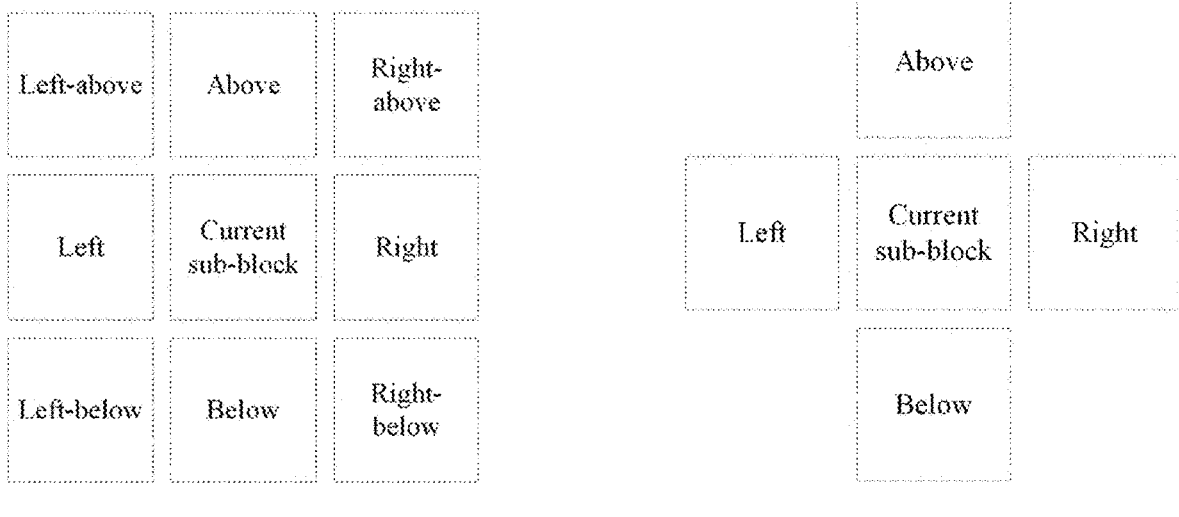
Fig. 26(a)　　　　　　　　　　　　　　Fig. 26(b)

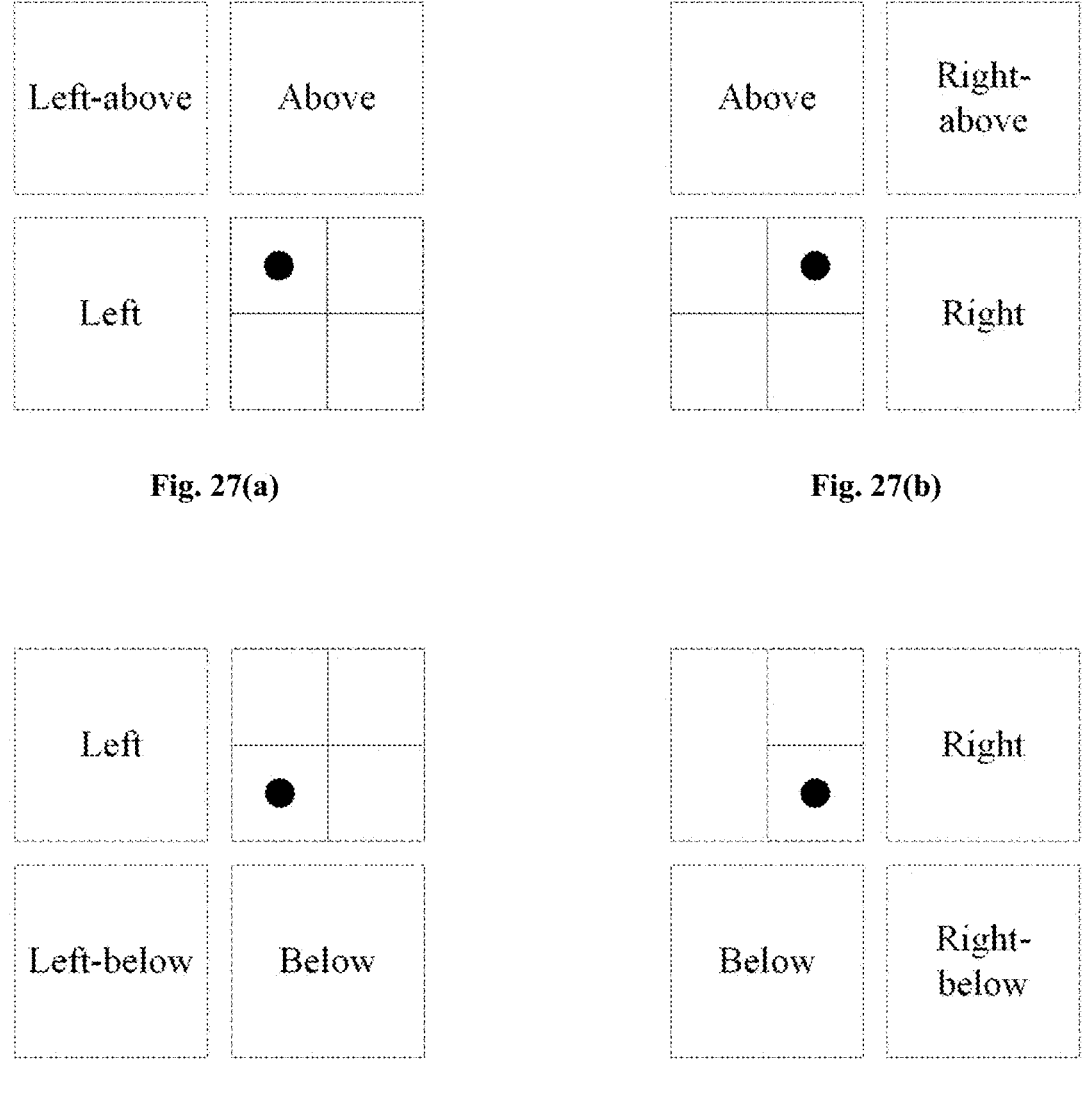
Fig. 27(a)                    Fig. 27(b)
Fig. 27(c)                    Fig. 27(d)

2900

2910

DERIVE A SAMPLE-BASED OPTICAL FLOW WITH AN AFFINE MOTION MODEL FOR EACH SUB-BLOCK ASSOCIATED WITH THE TARGET BLOCK

2920

PERFORMING THE CONVERSION BASED ON THE SAMPLE-BASED OPTICAL FLOW

3200 ⟍

METHOD, APPARATUS, AND MEDIUM FOR VIDEO PROCESSING

CROSS-REFERENCE TO RELATED APPLICATIONS

This application is a continuation of International Application No. PCT/CN2022/130395, filed on Nov. 7, 2022, which claims the benefit of International Application No. PCT/CN2021/129301 filed on Nov. 8, 2021. The entire contents of these applications are hereby incorporated by reference in their entireties.

FIELD

Embodiments of the present disclosure relates generally to video coding techniques, and more particularly, to sample-based bi-directional prediction methods with optical flow.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of video coding techniques is generally expected to be further improved.

SUMMARY

Embodiments of the present disclosure provide a solution for video processing.

In a first aspect, a method for video processing is proposed. The method comprises: deriving, during a conversion between a target block of a video and a bitstream of the target block, a sample-based optical flow with an affine motion model for each sub-block associated with the target block; and performing the conversion based on the sample-based optical flow. Compared with conventional technologies, accuracy and continuity of optical flow motion field are improved. Furthermore, coding efficiency can be improved.

In a second aspect, another method for video processing is proposed. The method comprises: determining, during a conversion between a target block of a video and a bitstream of the target block, whether to apply a sample-based optical flow coding method based on a condition associated with the target block; and performing the conversion based on the determining. Compared with conventional technologies, accuracy and continuity of optical flow motion field are improved. Furthermore, coding efficiency can be improved.

In a third aspect, another method for video processing is proposed. The method comprises: deriving, during a conversion between a target block of a video and a bitstream of the target block, an optical flow of a sub-block outside of the target block; and performing the conversion based on the optical flow. Compared with conventional technologies, accuracy and continuity of optical flow motion field are improved. Furthermore, coding efficiency can be improved.

In a fourth aspect, another method for video processing is proposed. The method comprises: applying, during a conversion between a target block of a video and a bitstream of the target block, a filtering process on an optical flow field or motion field of a sub-block in an optical flow-based coding method associated with the target block; and performing the conversion based on the filtering process. Compared with conventional technologies, accuracy and continuity of optical flow motion field are improved. Furthermore, coding efficiency can be improved.

In a fifth aspect, an apparatus for processing video data is proposed. The apparatus for processing video data comprising a processor and a non-transitory memory with instructions thereon, wherein the instructions upon execution by the processor, cause the processor to perform a method in accordance with any of the first, second, third or fourth aspect.

In a sixth aspect, a non-transitory computer-readable storage medium is proposed. The non-transitory computer-readable storage medium stores instructions that cause a processor to perform a method in accordance with any of the first, second, third or fourth aspect.

In a seventh aspect, a non-transitory computer-readable recording medium is proposed. The non-transitory computer-readable recording medium stores a bitstream of a video which is generated by a method performed by a video processing apparatus. The method comprises: deriving a sample-based optical flow with an affine motion model for each sub-block associated with a target block of the video; and generating a bitstream of the target block based on the sample based optical flow.

In an eighth aspect, a method for storing bitstream of a video, comprises: deriving a sample-based optical flow with an affine motion model for each sub-block associated with a target block of the video; generating a bitstream of the target block based on the sample based optical flow; and storing the bitstream in a non-transitory computer-readable recording medium.

In a ninth aspect, another non-transitory computer-readable recording medium is proposed. The non-transitory computer-readable recording medium stores a bitstream of a video which is generated by a method performed by a video processing apparatus. The method comprises: determining whether to apply a sample-based optical flow coding method based on a condition associated with a target block of the video; and generating a bitstream of the target block based on the determining.

In a tenth aspect, a method for storing bitstream of a video, comprises: determining whether to apply a sample-based optical flow coding method based on a condition associated with a target block of the video; generating a bitstream of the target block based on the determining; and storing the bitstream in a non-transitory computer-readable recording medium.

In an eleventh aspect, another non-transitory computer-readable recording medium is proposed. The non-transitory computer-readable recording medium stores a bitstream of a video which is generated by a method performed by a video processing apparatus. The method comprises: deriving, during a conversion between a target block of a video and a bitstream of the target block, an optical flow of a sub-block outside of a target block of the video; and generating a bitstream of the target block based on the optical flow.

In a twelfth aspect, a method for storing bitstream of a video, comprises: deriving, during a conversion between a target block of a video and a bitstream of the target block, an optical flow of a sub-block outside of a target block of the video; generating a bitstream of the target block based on the optical flow; and storing the bitstream in a non-transitory computer-readable recording medium.

In a thirteenth aspect, another non-transitory computer-readable recording medium is proposed. The non-transitory computer-readable recording medium stores a bitstream of a video which is generated by a method performed by a video processing apparatus. The method comprises: applying a filtering process on an optical flow field or motion field of a sub-block in an optical flow-based coding method associated a target block of the video; and generating a bitstream of the target block based on the filtering process.

In a fourteenth aspect, a method for storing bitstream of a video, comprises: applying a filtering process on an optical flow field or motion field of a sub-block in an optical flow-based coding method associated a target block of the video; generating a bitstream of the target block based on the filtering process; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 25 shows a schematic diagram of virtual block in the i-th search round;

FIGS. 26(*a*) and 26(*b*) show a schematic diagram of neighboring sub-blocks used in the interpolation;

FIGS. 27(*a*), 27(*b*), 27(*c*), and 27(*d*) show a schematic diagram of neighboring sub-blocks used in the interpolation;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
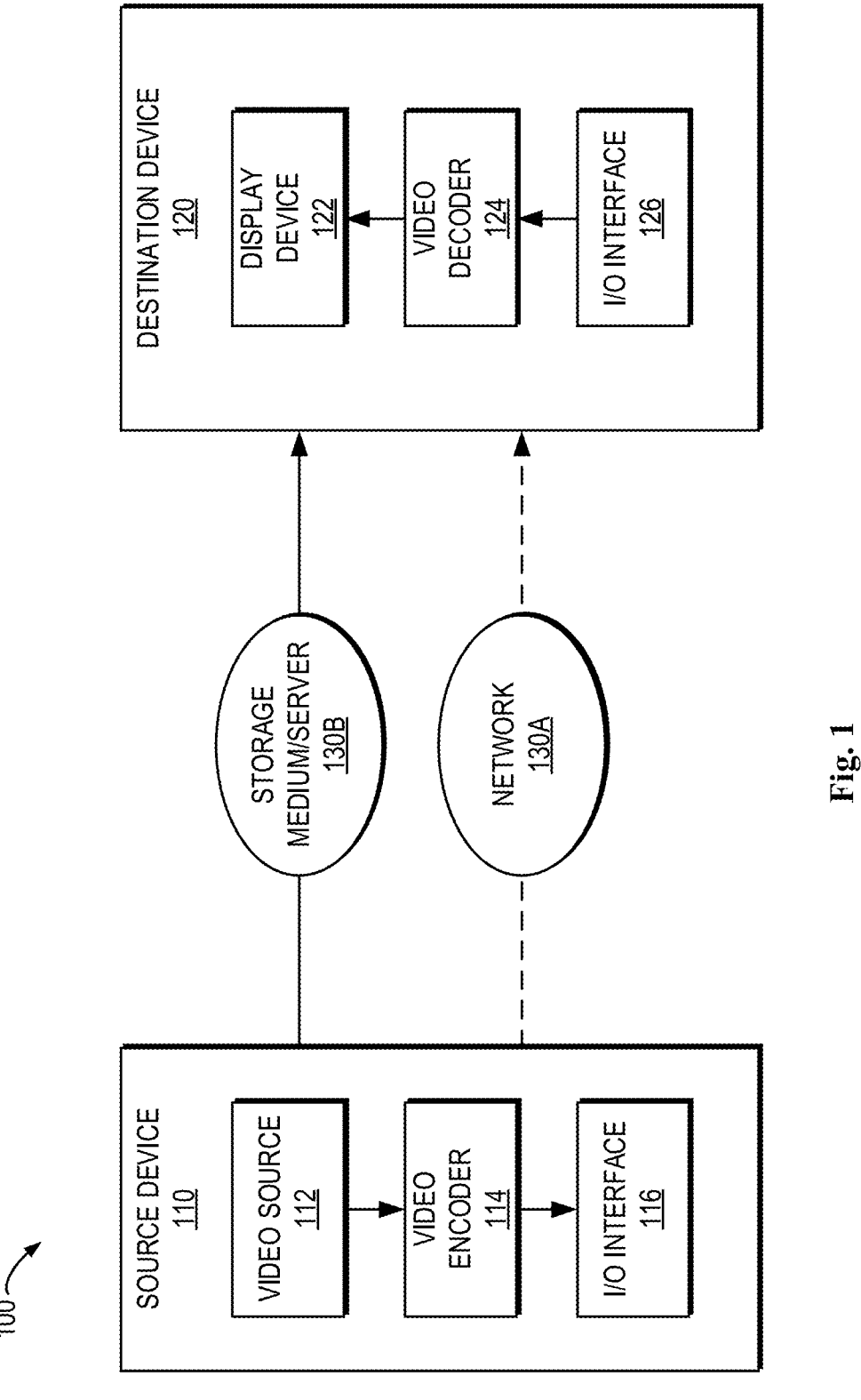
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
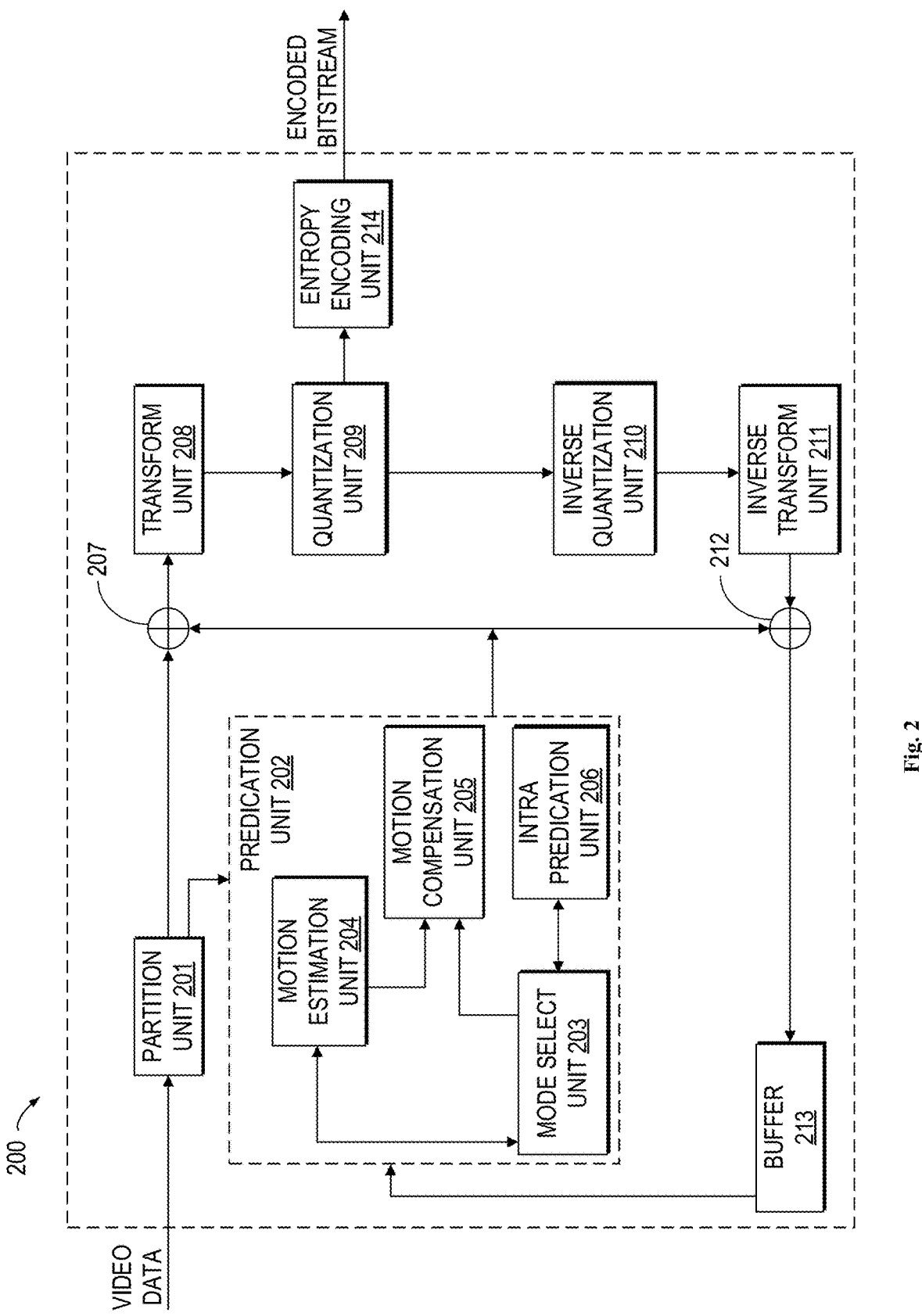
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
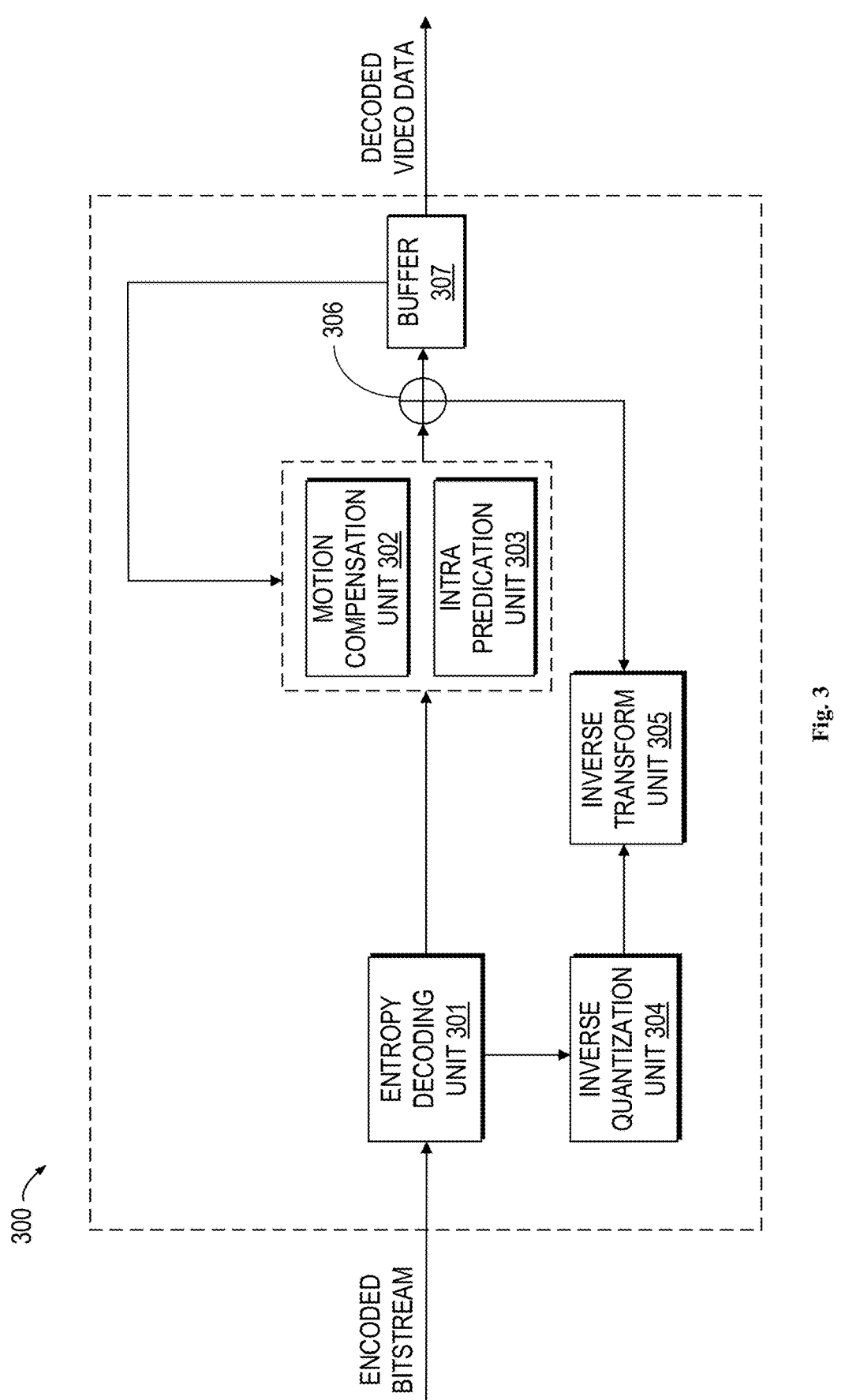
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This present disclosure is related to video coding technologies. Specifically, it is related to sample-based bidirectional prediction method with optical flow. The optical flow motion filed is generated with different methods. It may be applied to the existing video coding standard like HEVC, or Versatile Video Coding (VVC). It may be also applicable to future video coding standards or video codec.

2. Background

Figure 4:
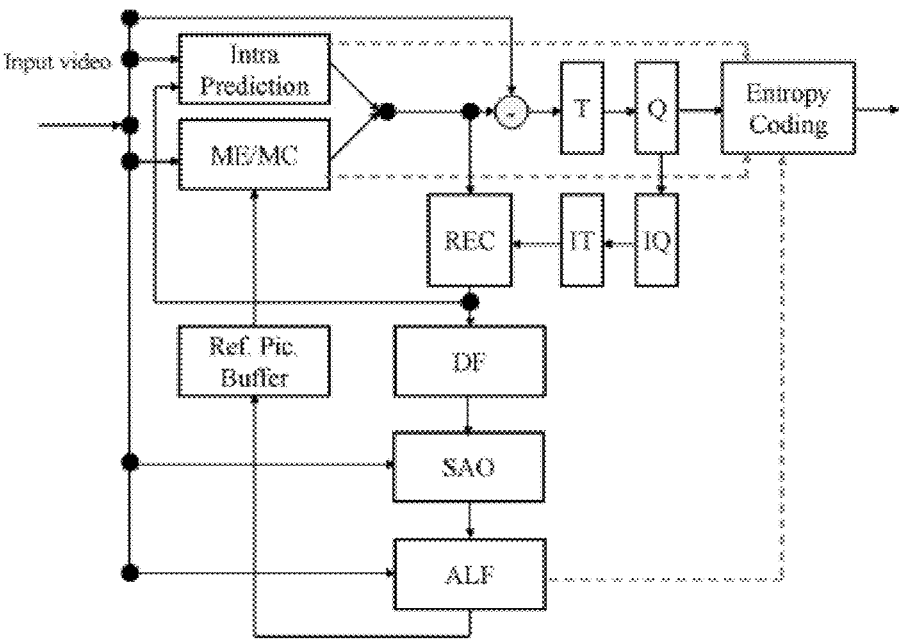
FIG. 4 shows an example of encoder block diagram of VVC.
Figure 5:
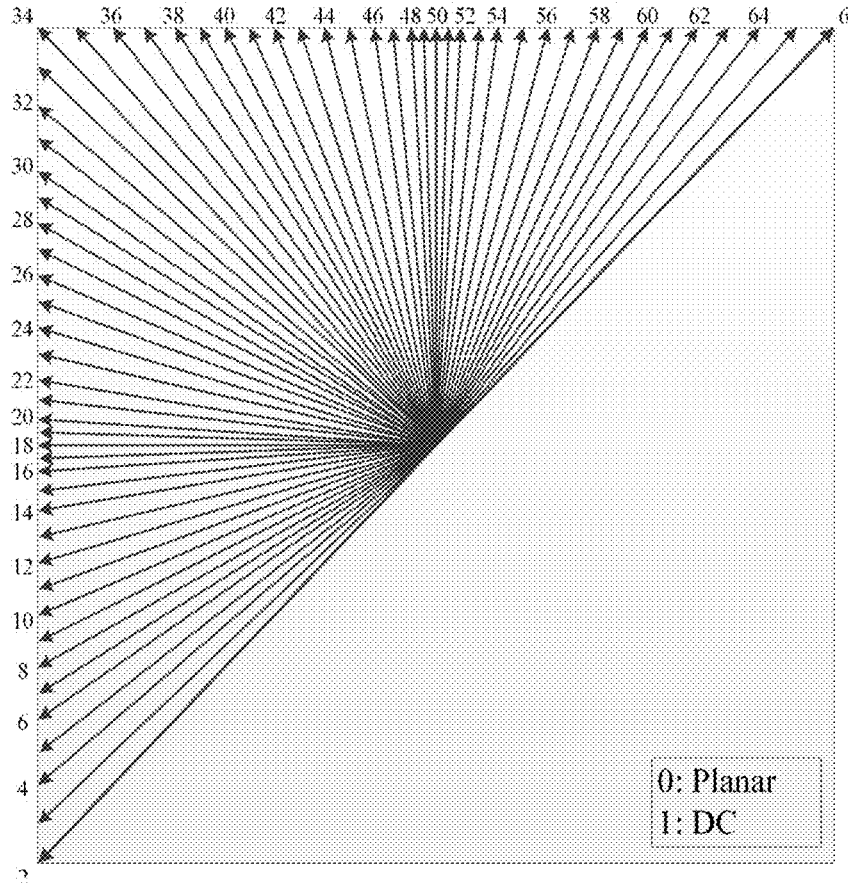
FIG. 5 shows 67 intra prediction modes.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC. The latest version of VVC draft, i.e., Versatile Video Coding (Draft 10) could be found at: http://phenix.it-sudparis.eu/jvet/doc_end_user/documents/20_Teleconference/wg11/JVET-T2001-v1.zip
The latest reference software of VVC, named VTM, could be found at: https://vcgit.hhi.fraunhofer.de/jvet/VVCSoftware_VTM/-/tags/VTM-11.0
2.1. Coding Flow of a Typical Video Codec
FIG. 4 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.
2.2. Intra Mode Coding with 67 Intra Prediction Modes
To capture the arbitrary edge directions presented in natural video, the number of directional intra modes is extended from 33, as used in HEVC, to 65, as shown in FIG. 5, and the planar and DC modes remain the same. These denser directional intra prediction modes apply for all block sizes and for both luma and chroma intra predictions.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.2.1. Wide Angle Intra Prediction

Although 67 modes are defined in the VVC, the exact prediction direction for a given intra prediction mode index is further dependent on the block shape. Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 6:
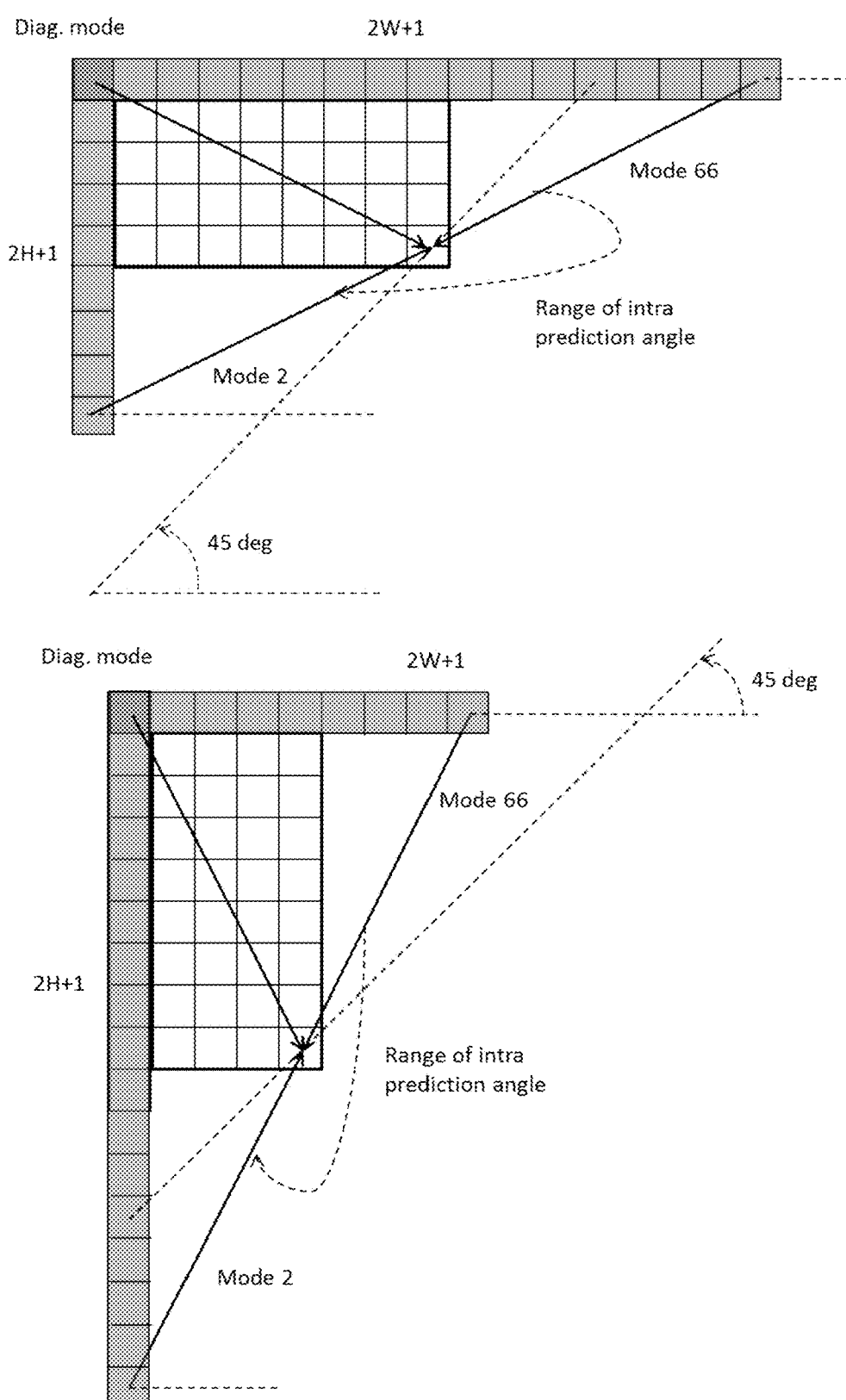
FIG. 6 shows reference samples for wide-angular intra prediction.

To support these prediction directions, the top reference with length 2W+1, and the left reference with length 2H+1, are defined as shown in FIG. 6.

The number of replaced modes in wide-angular direction mode depends on the aspect ratio of a block. The replaced intra prediction modes are illustrated in Table 2-1.

TABLE 2-1

Intra prediction modes replaced by wide-angular modes

| Aspect ratio | Replaced intra prediction modes |
| --- | --- |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == ½ | Modes 59, 60, 61, 62, 63, 64, 65, 66 |
| W/H == ¼ | Mode 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 7:
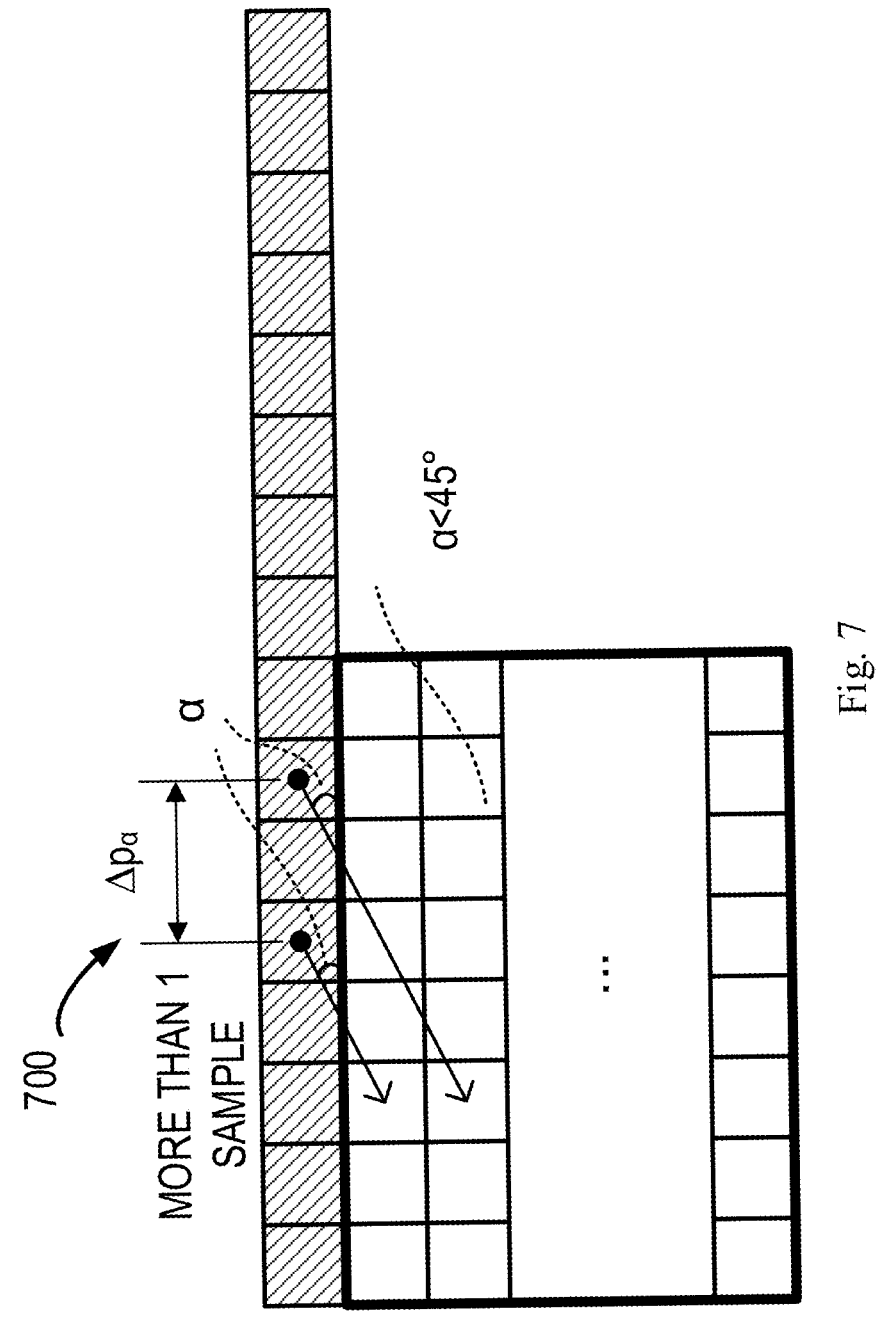
FIG. 7 shows a schematic diagram of problem of discontinuity in case of directions beyond 45°.

FIG. 7 shows a schematic diagram 700 of problem of discontinuity in case of directions beyond 45°. As shown in FIG. 7, two vertically adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135 degree and above 45 degree, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

2.3. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.4. Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs. At CU level, IBC mode is signalled with a flag and it can be signalled as IBC AMVP mode or IBC skip/merge mode as follows:

IBC skip/merge mode: a merge candidate index is used to indicate which of the block vectors in the list from neighbouring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

2.5. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order.

The distances (i.e. POC difference) from two reference pictures to the current picture are same.

Both reference pictures are short-term reference pictures.

The CU is not coded using affine mode or the SbTMVP merge mode.

CU has more than 64 luma samples.

Both CU height and CU width are larger than or equal to 8 luma samples.

BCW weight index indicates equal weight.

WP is not enabled for the current CU.

CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process. First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = \left( \left( I^{(k)}(i+1, j) \gg shift1 \right) - \left( I^{(k)}(i-1, j) \gg shift1 \right) \right) \quad (2-1)$$

$$\frac{\partial I^{(k)}}{\partial y}(i, j) = \left( \left( I^{(k)}(i, j+1) \gg shift1 \right) - \left( I^{(k)}(i, j-1) \gg shift1 \right) \right)$$

where $I^{(k)}(i,j)$ are the sample value at coordinate (i,j) of the prediction signal in list k, k=0,1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as

14

$$S_1 = \sum\nolimits_{(i,j)\in\Omega} \text{Abs}(\psi_x(i, j)), \quad (2-2)$$

$$S_3 = \sum\nolimits_{(i,j)\in\Omega} \theta(i, j) \cdot \text{Sign}(\psi_x(i, j))$$

$$S_2 = \sum_{(i,j)\in\Omega} \psi_x(i, j) \cdot \text{Sign}(\psi_y(i, j))$$

$$S_5 = \sum\nolimits_{(i,j)\in\Omega} \text{Abs}(\psi_y(i, j)),$$

$$S_6 = \sum\nolimits_{(i,j)\in\Omega} \theta(i, j) \cdot \text{Sign}(\psi_y(i, j))$$

where $$\psi_x(i, j) = \left( \frac{\partial I^{(1)}}{\partial x}(i, j) + \frac{\partial I^{(0)}}{\partial x}(i, j) \right) \gg n_a \quad (2-3)$$

$$\psi_y(i, j) = \left( \frac{\partial I^{(1)}}{\partial y}(i, j) + \frac{\partial I^{(0)}}{\partial y}(i, j) \right) \gg n_a$$

$$\theta(i, j) = \left( I^{(1)}(i, j) \gg n_b \right) - \left( I^{(0)}(i, j) \gg n_b \right)$$

where $\Omega$ is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0 ? \text{clip3} \left( -th'_{BIO}, th'_{BIO}, -((S_3 \cdot 2^{n_b-n_a}) \gg \lfloor \log_2 S_1 \rfloor) \right) : 0 \quad (2-4)$$

$$v_y = S_5 > 0 ? \text{clip3} \left( -th'_{BIO}, th'_{BIO}, -((S_6 \cdot 2^{n_b-n_a} - ((v_x S_{2,m}) \ll n_{S_2} + v_x S_{2,s})/2) \gg \lfloor \log_2 S_5 \rfloor) \right) : 0$$

where $$S_{2,m} = S_2 \gg n_{S_2}, S_{2,s} = S_2 \& (2^{n_{S_2}} - 1), th'_{BIO} = 2^{max(5,BD-7)}.$$

$\lfloor \cdot \rfloor$ is the floor function, and $n_{S_2}=12$.

Based on the motion refinement and the gradients, the following adjustment is calculated for each sample in the 4×4 subblock:

$$b(x, y) = rnd \left( \left( v_x \left( \frac{\partial I^{(1)}(x, y)}{\partial x} - \frac{\partial I^{(0)}(x, y)}{\partial x} \right) + \right. \right. \quad (2-5)$$

$$\left. \left. v_y \left( \frac{\partial I^{(1)}(x, y)}{\partial y} - \frac{\partial I^{(0)}(x, y)}{\partial y} \right) + 1 \right)/2 \right)$$

Finally, the BDOF samples of the CU are calculated by adjusting the bi-prediction samples as follows:

$$pred_{BDOF}(x, y) = \left( I^{(0)}(x, y) + I^{(1)}(x, y) + b(x, y) + o_{offset} \right) \gg shift. \quad (2-6)$$

These values are selected such that the multipliers in the BDOF process do not exceed 15-bit, and the maximum bit-width of the intermediate parameters in the BDOF process is kept within 32-bit.

Figure 8:
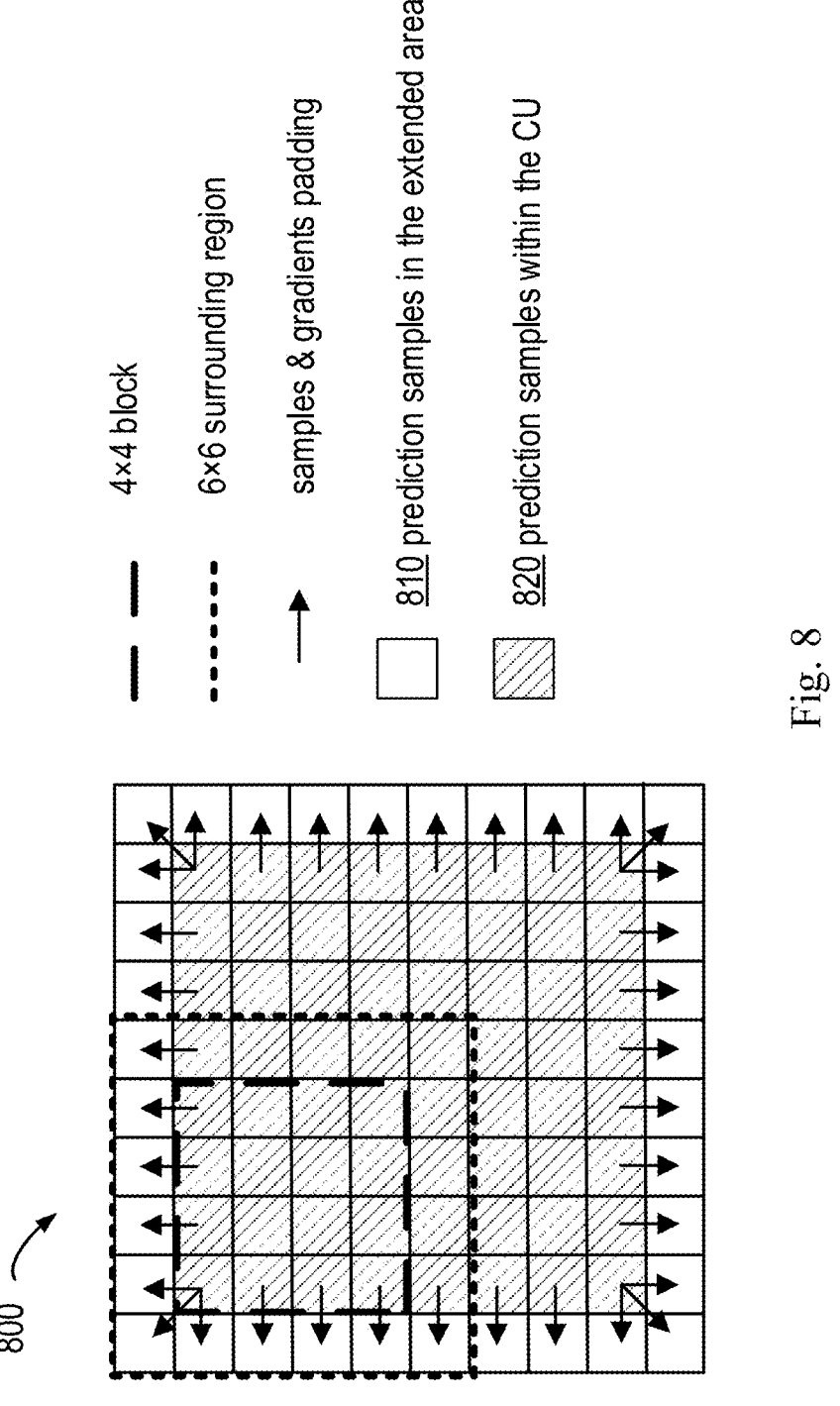
FIG. 8 illustrates a schematic diagram of extended CU region used in BDOF.

In order to derive the gradient values, some prediction samples $I^{(k)}(i,j)$ in list k (k=0,1) outside of the current CU boundaries need to be generated. FIG. 8 illustrates a schematic diagram of extended CU region used in BDOF. As depicted in the diagram 800 of FIG. 8, the BDOF in VVC uses one extended row/column around the CU's boundaries. In order to control the computational complexity of generating the out-of-boundary prediction samples, prediction samples in the extended area (denoted as 810 in FIG. 8) are generated by taking the reference samples at the nearby integer positions (using floor( ) operation on the coordinates) directly without interpolation, and the normal 8-tap motion compensation interpolation filter is used to generate prediction samples within the CU (denoted as 820 in FIG. 8). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to $(8*W*(H>>1))$, where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

2.6. Affine Motion Compensated Prediction

Figure 9:
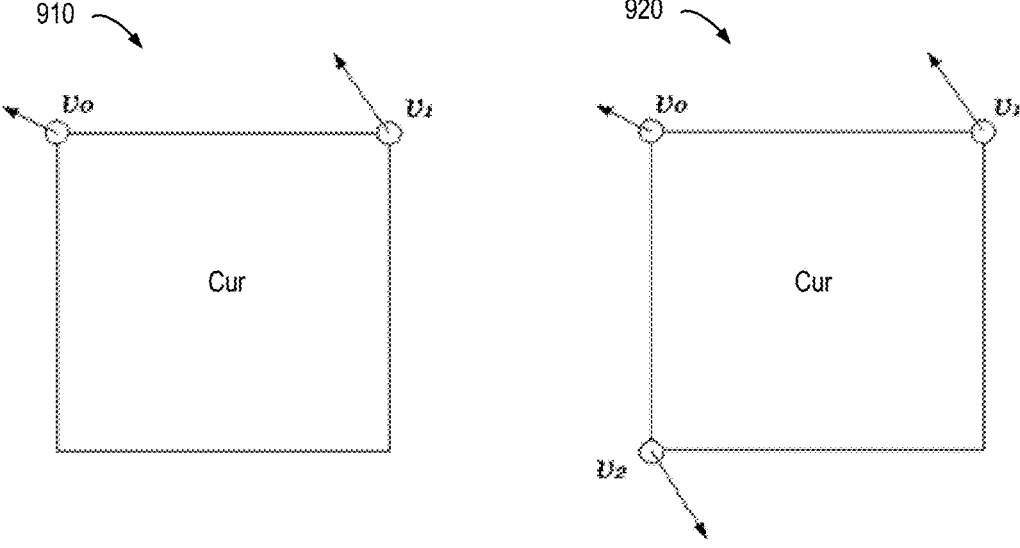
FIG. 9 illustrates a schematic diagram of control point based affine motion model.

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. FIG. 9 illustrates a schematic diagram of control point based affine motion model. As shown FIG. 9, the affine motion field of the block is described by motion information of two control point (4-parameter) or three control point motion vectors (6-parameter).

For the 4-parameter affine motion model 910 in FIG. 9, motion vector at sample location (x, y) in a block is derived as:

$$\begin{cases} mv_x = \dfrac{mv_{1x} - mv_{0x}}{W}x + \dfrac{mv_{0y} - mv_{1y}}{W}y + mv_{0x} \\ mv_y = \dfrac{mv_{1y} - mv_{0y}}{W}x + \dfrac{mv_{1x} - mv_{0x}}{W}y + mv_{0y} \end{cases}.$$

For the 6-parameter affine motion model 920 in FIG. 9, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 10:
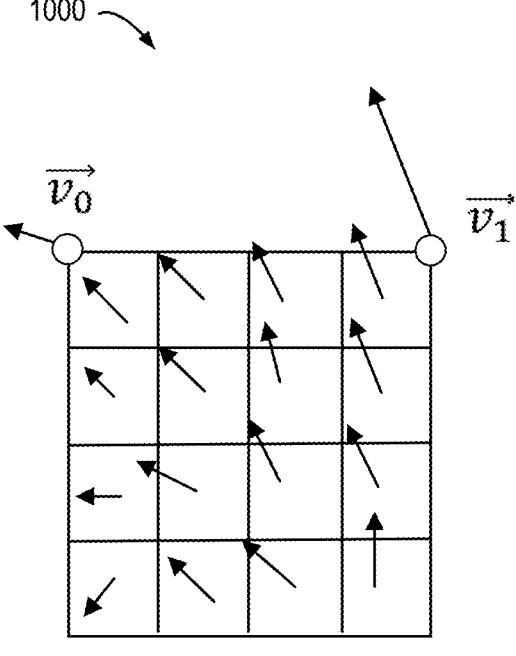
FIG. 10 illustrates a schematic diagram of affine MVF per subblock.

In order to simplify the motion compensation prediction, block based affine transform prediction is applied. FIG. 10 illustrates a schematic diagram 1000 of affine MVF per subblock. To derive motion vector of each 4×4 luma subblock, the motion vector of the center sample of each subblock, as shown in FIG. 25, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

2.6.1. Affine Merge Prediction

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs;

Constructed affine merge candidates CPMVPs that are derived using the translational MVs of the neighbour CUs;

Zero MVs.

Figure 11:
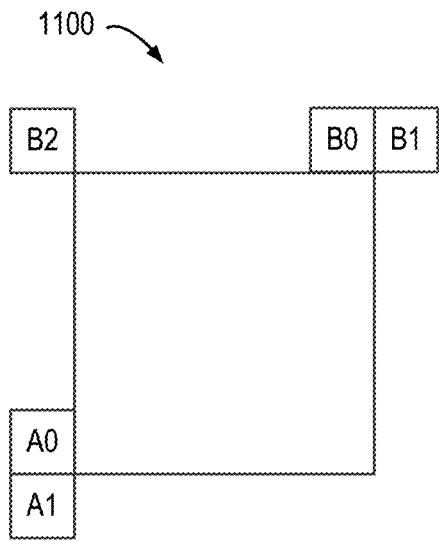
FIG. 11 illustrates a schematic diagram of locations of inherited affine motion predictors.
Figure 12:
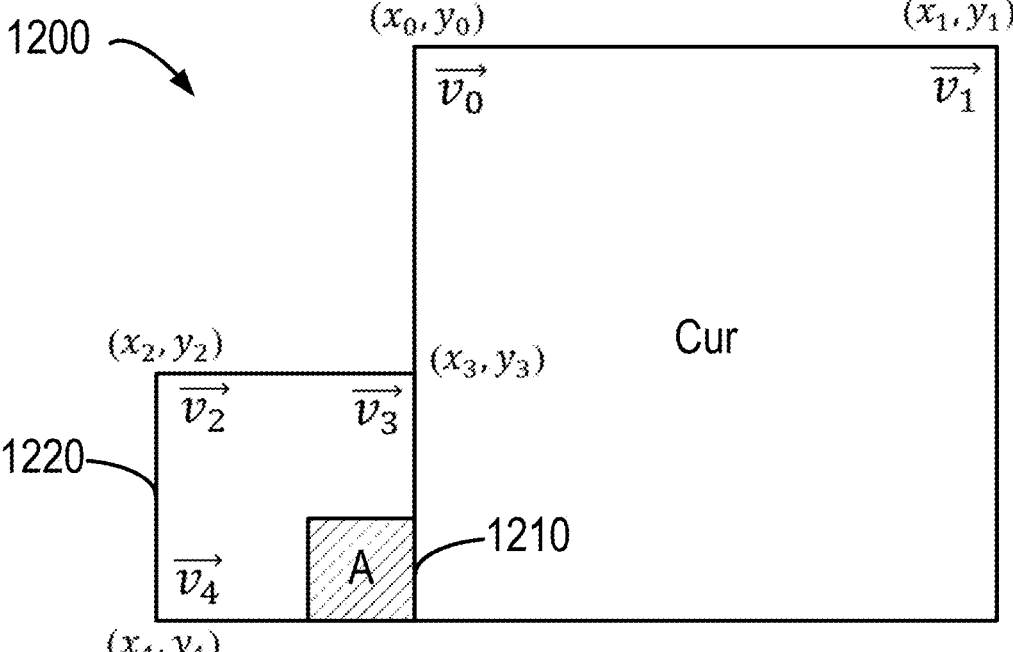
FIG. 12 illustrates a schematic diagram of control point motion vector inheritance.

In VVC, there are maximum two inherited affine candidates, which are derived from affine motion model of the neighboring blocks, one from left neighboring CUs and one from above neighboring CUs. FIG. 11 illustrates a schematic diagram 1100 of locations of inherited affine motion predictors. The candidate blocks are shown in FIG. 11. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU. FIG. 12 illustrates a schematic diagram of control point motion vector inheritance. As shown in FIG. 12, if the neighbour left bottom block A 1210 is coded in affine mode, the motion vectors $v_2$, $v_3$ and $v_4$ of the top left corner, above right corner and left bottom corner of the CU 1220 which contains the block A 1210 are attained. When block A 1210 is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbor translational motion information of each control point. The motion information for the control points is derived from the specified spatial neighbors and temporal neighbor shown in FIG. 13 which illustrates a schematic diagram 1300 of locations of candidates position for constructed affine merge mode. $CPMV_k$ (k=1, 2, 3, 4) represents the k-th control point. For $CPMV_1$, the B2→B3→A2 blocks are checked and the MV of the first available block is used. For CPMV₂, the B1→B0 blocks are checked and for CPMV₃, the A1→A0 blocks are checked. TMVP is used as CPMV₄ if it's available.

After MVs of four control points are attained, affine merge candidates are constructed based on those motion information. The following combinations of control point MVs are used to construct in order:

{CPMV₁, CPMV₂, CPMV₃}, {CPMV₁, CPMV₂, CPMV₄}, {CPMV₁, CPMV₃, CPMV₄}, {CPMV₂, CPMV₃, CPMV₄}, {CPMV₁, CPMV₂}, {CPMV₁, CPMV₃}.

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.6.2. Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs;

Constructed affine AMVP candidates CPMVPs that are derived using the translational MVs of the neighbour CUs;

Translational MVs from neighbouring CUs;

Zero MVs.

The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 13:
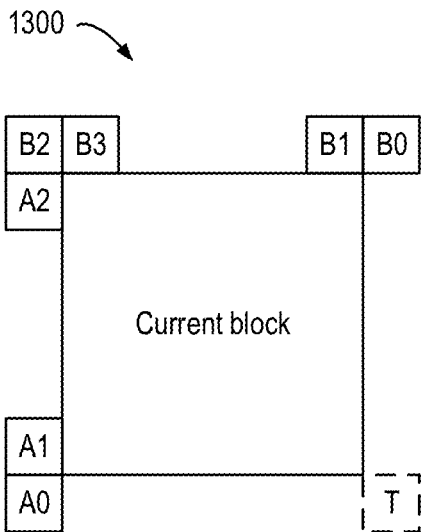
FIG. 13 shows a schematic diagram of locations of candidates position for constructed affine merge mode.

Constructed AMVP candidate is derived from the specified spatial neighbours shown in FIG. 13. The same checking order is used as done in affine merge candidate construction. In addition, reference picture index of the neighbouring block is also checked. The first block in the checking order that is inter coded and has the same reference picture as in current CUs is used. There is only one When the current CU is coded with 4-parameter affine mode, and mv₀ and mv₁ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after inherited affine AMVP candidates and Constructed AMVP candidate are checked, mv₀, mv₁, and mv₂ will be added, in order, as the translational MVs to predict all control point MVs of the current CU, when available. Finally, zero MVs are used to fill the affine AMVP list if it is still not full.

18

2.6.3. Affine Motion Information Storage

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and deblocking.

Figure 14:
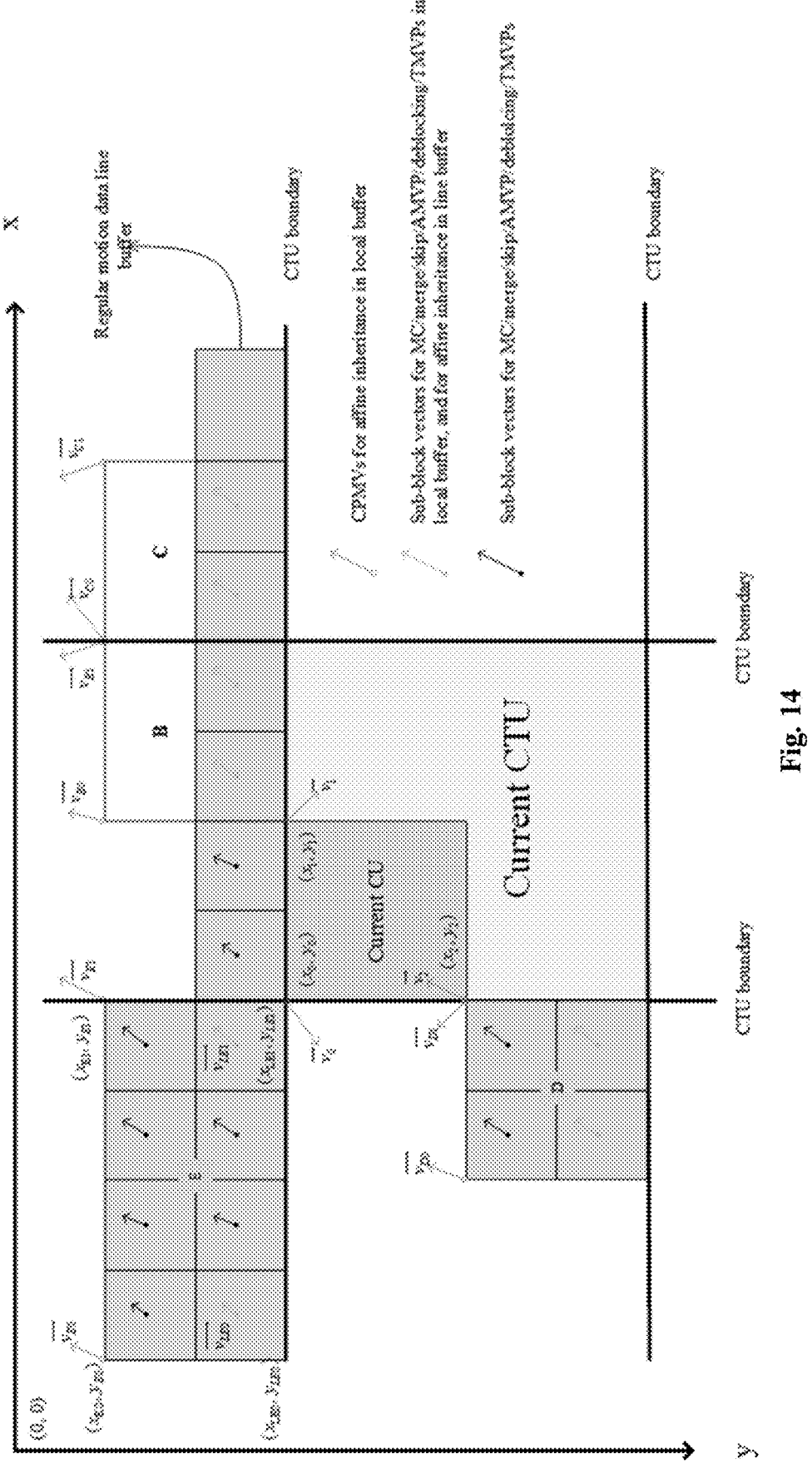
FIG. 14 illustrates motion vector usage for proposed combined method.

To avoid the picture line buffer for the additional CPMVs, affine motion data inheritance from the CUs from above CTU is treated differently to the inheritance from the normal neighbouring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in local buffer. If the candidate CU is 6-parameter affine coded, the affine model is degraded to 4-parameter model. FIG. 14 illustrates motion vector usage for proposed combined method. As shown in FIG. 14, along the top CTU boundary, the bottom-left and bottom right subblock motion vectors of a CU are used for affine inheritance of the CUs in bottom CTUs.

2.6.4. Prediction Refinement with Optical Flow for Affine Mode

Subblock based affine motion compensation can save memory access bandwidth and reduce computation complexity compared to pixel-based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i, j).

Step 2) The spatial gradients $g_x(i,j)$ and $g_y(i,j)$ of the subblock prediction are calculated at each sample location using a 3-tap filter [−1, 0, 1]. The gradient calculation is exactly the same as gradient calculation in BDOF.

$$g_x(i, j) = (I(i + 1, j) \gg shift1) - (I(i - 1, j) \gg shift1) \quad (2-9)$$

$$g_y(i, j) = (I(i, j + 1) \gg shift1) - (I(i, j - 1) \gg shift1) \quad (2-10)$$

shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figure 15:
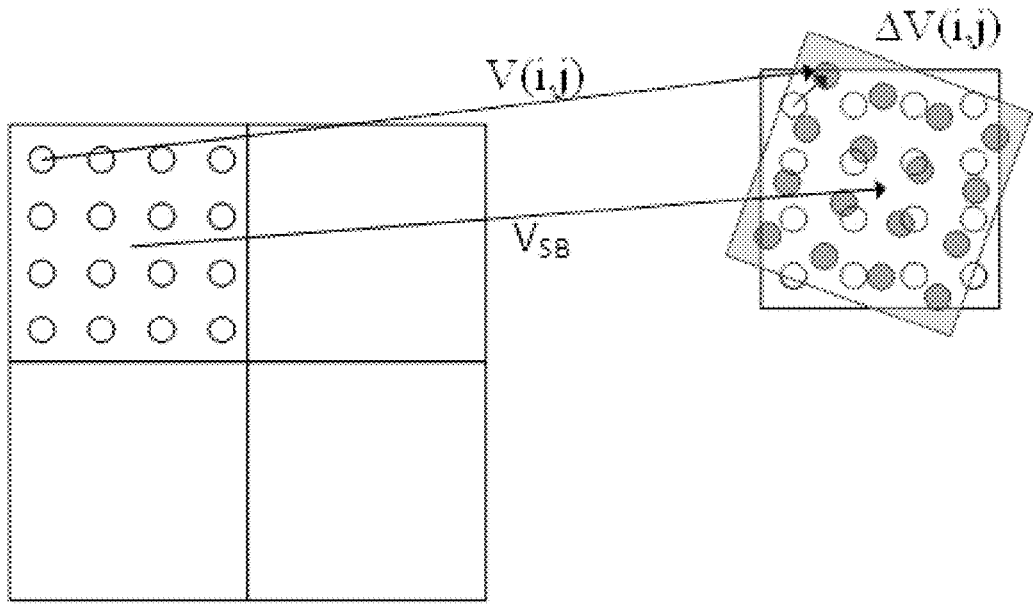
FIG. 15 shows Subblock MV VSB and pixel $\Delta v(i, j)$.

Step 3) The luma prediction refinement is calculated by the following optical flow equation.

$$\Delta I(i, j) = g_x(i, j) * \Delta v_x(i, j) + g_y(i, j) * \Delta v_y(i, j) \quad (2-11)$$

where the Δv(i,j) is the difference between sample MV computed for sample location (i,j), denoted by v(i,j), and the subblock MV of the subblock to which sample (i,j) belongs, as shown in FIG. 15. The Δv(i, j) is quantized in the unit of ⅟₃₂ luam sample precision.

Since the affine model parameters and the sample location relative to the subblock center are not changed from subblock to subblock, $\Delta v(i,j)$ can be calculated for the first subblock, and reused for other subblocks in the same CU. Let $dx(i,j)$ and $dy(i,j)$ be the horizontal and vertical offset from the sample location $(i,j)$ to the center of the subblock $(x_{SB}, y_{SB})$, $\Delta V(x, y)$ can be derived by the following equation, $$\begin{cases} dx(i, j) = i - x_{SB} \\ dy(i, j) = j - y_{SB} \end{cases} \quad (2\text{-}12)$$

$$\begin{cases} \Delta v_x(i, j) = C * dx(i, j) + D * dy(i, j) \\ \Delta v_y(i, j) = E * dx(i, j) + F * dy(i, j) \end{cases} \quad (2\text{-}13)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \dfrac{v_{1x} - v_{ox}}{w} \\ E = -D = \dfrac{v_{1y} - v_{0y}}{w} \end{cases} \quad (2\text{-}14)$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (2\text{-}15)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement $\Delta I(i,j)$ is added to the subblock prediction $I(i, j)$. The final prediction $I'$ is generated as the following equation.

$$I'(i, j) = I(i, j) + \Delta I(i, j). \quad (2\text{-}16)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.7. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi\text{-}pred} = ((8 - w) * P_0 + w * P_1 + 4) \gg 3. \quad (2\text{-}17)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used. Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied).For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g., equal weight.

2.8. Local Illumination Compensation (LIC)

Figure 16:
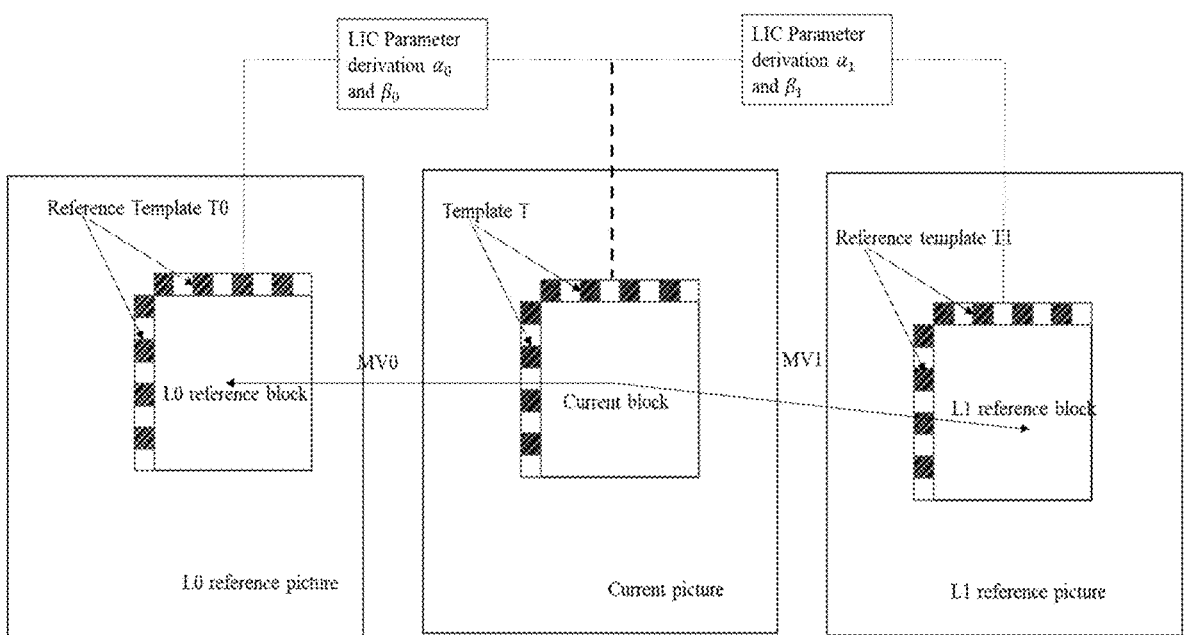
FIG. 16 shows a schematic diagram of local illumination compensation.

Local illumination compensation (LIC) is a coding tool to address the issue of local illumination changes between current picture and its temporal reference pictures. The LIC is based on a linear model where a scaling factor and an offset are applied to the reference samples to obtain the prediction samples of a current block. Specifically, the LIC can be mathematically modeled by the following equation:

$$P(x, y) = \alpha \cdot P_r(x + v_x, y + v_y) + \beta$$

where P(x, y) is the prediction signal of the current block at the coordinate (x, y); $P_r(x+v_x, y+v_y)$ is the reference block pointed by the motion vector $(v_x, v_y)$; $\alpha$ and $\beta$ are the corresponding scaling factor and offset that are applied to the reference block. FIG. 16 illustrates the LIC process. In FIG. 16, when the LIC is applied for a block, a least mean square error (LMSE) method is employed to derive the values of the LIC parameters (i.e., $\alpha$ and $\beta$) by minimizing the difference between the neighboring samples of the current block (i.e., the template T in FIG. 16) and their corresponding reference samples in the temporal reference pictures (i.e., either T0 or T1 in FIG. 16). Additionally, to reduce the computational complexity, both the template samples and the reference template samples are subsampled (adaptive subsampling) to derive the LIC parameters, i.e., only the shaded samples in FIG. 16 are used to derive $\alpha$ and $\beta$.

Figure 17:
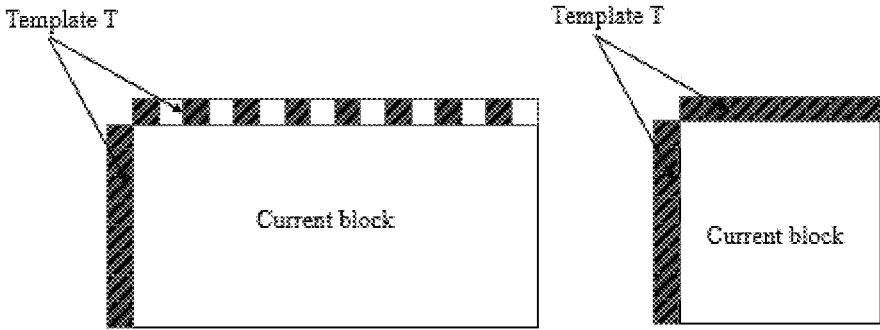
FIG. 17 shows a schematic diagram of no subsampling for the short side.

To improve the coding performance, no subsampling for the short side is performed as shown in FIG. 17.

2.9. Decoder Side Motion Vector Refinement (DMVR)

Figure 18:
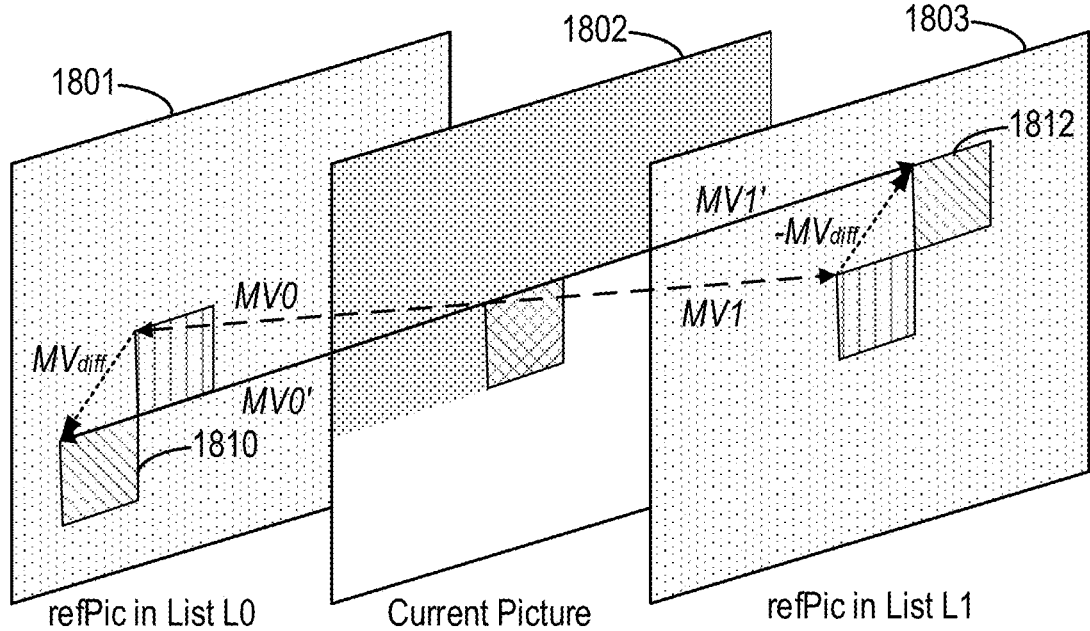
FIG. 18 shows a schematic diagram illustrating the decoding side motion vector refinement.

In order to increase the accuracy of the MVs of the merge mode, a bilateral-matching based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 18 is a schematic diagram illustrating the decoding side motion vector refinement. As illustrated in FIG. 18, the SAD between the blocks 1810 and 1812 based on each MV candidate around the initial MV is calculated, where the block 1810 is in a reference picture 1801 in the list L0 and the block 1812 is in a reference picture 1803 in the List L1 for the current picture 1802. The MV candidate with the lowest SAD becomes the refined MV and used to generate the bi-predicted signal.

In VVC, the DMVR can be applied for the CUs which are coded with following modes and features:

CU level merge mode with bi-prediction MV;

One reference picture is in the past and another reference picture is in the future with respect to the current picture;

The distances (i.e. POC difference) from two reference pictures to the current picture are same;

Both reference pictures are short-term reference pictures;

CU has more than 64 luma samples;

Both CU height and CU width are larger than or equal to 8 luma samples;

BCW weight index indicates equal weight;

WP is not enabled for the current block;

CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.9.1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' - MV0 + \text{MV\_offset} \qquad (2\text{--}18)$$

$$MV1' - MV1 + \text{MV\_offset} \qquad (2\text{--}19)$$

where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \qquad (2\text{--}20)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))) \quad (2\text{--}21)$$

$$y_{min} = (E(0, -1) - E(0, 1))/(2((E(0, -1) + E(0, 1) - 2E(0, 0))). \quad (2\text{--}22)$$

The value of $x_{min}$ and $y_{min}$ are automatically constrained to be between −8 and 8 since all cost values are positive and the smallest value is E(0,0). This corresponds to half peal offset with ¹⁄₁₆th-pel MV accuracy in VVC. The computed fractional $(x_{min}, y_{min})$ are added to the integer distance refinement MV to get the sub-pixel accurate refinement delta MV.

2.9.2. Bilinear-Interpolation and Sample Padding

In VVC, the resolution of the MVs is ¹⁄₁₆ luma samples. The samples at the fractional position are interpolated using an 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.9.3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.10. Multi-pass decoder-side motion vector refinement

In this contribution, a multi-pass decoder-side motion vector refinement is applied instead of DMVR. In the first pass, bilateral matching (BM) is applied to a coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

2.10.1. First Pass—Block Based Bilateral Matching MV Refinement

In the first pass, a refined MV is derived by applying BM to a coding block. Similar to decoder-side motion vector refinement (DMVR), the refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV and half-pel sample precision halfDeltaMv. The local search applies a 3×3 square search pattern to loop through the search range [−sHor, sHor] in a horizontal direction and [−sVer, sVer] in a vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of the distortion between the reference blocks. When the bilCost at the center point of the 3×3 search pattern has the minimum cost, the intDeltaMV or halfDeltaMV local search is terminated. Otherwise, the current minimum cost search point becomes the new center point of the 3×3 search pattern and the search for the minimum cost continues, until it reaches the end of the search range.

The existing fractional sample refinement is further applied to derive the final deltaMV. The refined MVs after the first pass are then derived as:

$$MV0\_pass1 = MV0 + deltaMV$$

$$MV1\_pass1 = MV0 - deltaMV.$$

2.10.2. Second Pass—Subblock Based Bilateral Matching MV Refinement

In the second pass, a refined MV is derived by applying BM to a 16×16 grid subblock. For each subblock, the refined MV is searched around the two MVs (MV0_pass1 and MV1_pass1), obtained on the first pass for the reference picture list L0 and L1. The refined MVs (MV0_pass2 (sbIdx2) and MV1_pass2(sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in a horizontal direction and [−sVer, sVer] in a vertical direction, wherein, the values of sHor and sVer are determined by the block dimension, and the maximum value of sHor and sVer is 8.

Figure 19:
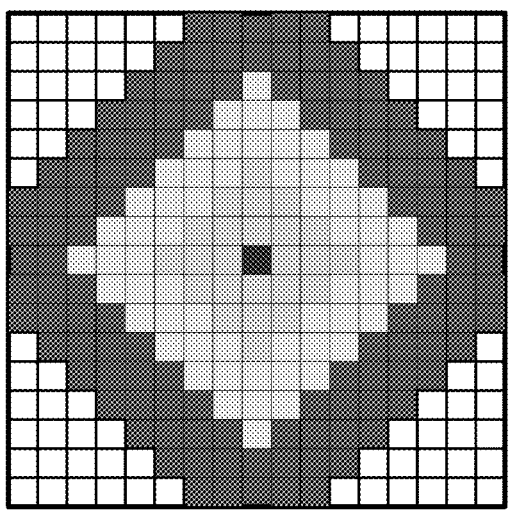
FIG. 19 shows a schematic diagram of diamond regions in the search area.

The bilateral matching cost is calculated by applying a cost factor to the SATD cost between the two reference subblocks, as: bilCost=satdCost*costFactor. The search area (2*sHor+1)*(2*sVer+1) is divided up to 5 diamond shape search regions shown on FIG. 19. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

BM performs local search to derive half sample precision halfDeltaMv. The search pattern and cost function are the same as defined in 2.9.1.

The existing VVC DMVR fractional sample refinement is further applied to derive the final deltaMV(sbIdx2). The refined MVs at second pass is then derived as:

$$MV0\_pass2(sbIdx2) = MV0\_pass1 + deltaMV(sbIdx2)$$

$$MV1\_pass2(sbIdx2) = MV1\_pass1 - deltaMV(sbIdx2)$$

2.10.3. Third Pass—Subblock Based Bi-Directional Optical Flow MV Refinement

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to ¹⁄₁₆ sample precision and clipped between −32 and 32.

The refined MVs (MV0_pass3(sbIdx3) and MV1_pass3 (sbIdx3)) at third pass are derived as:

$$MV0\_pass3(sbIdx3) = MV0\_pass2(sbIdx2) + bioMv$$

$$MV1\_pass3(sbIdx3) = MV0\_pass2(sbIdx2) - bioMv.$$

2.11. Sample-Based BDOF

In the sample-based BDOF, instead of deriving motion refinement (Vx, Vy) on a block basis, it is performed per sample.

The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

2.12. Extended Merge Prediction

In VVC, the merge candidate list is constructed by including the following five types of candidates in order:

(1) Spatial MVP from spatial neighbour CUs;
(2) Temporal MVP from collocated CUs;
(3) History-based MVP from a FIFO table;
(4) Pairwise average MVP;
(5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.12.1. Spatial Candidates Derivation

Figure 20:
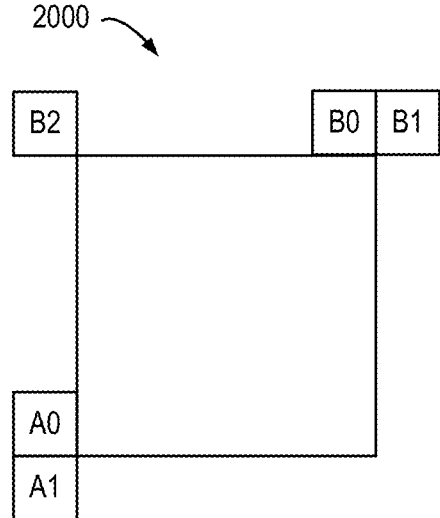
FIG. 20 shows positions of spatial merge candidate.
Figure 21:
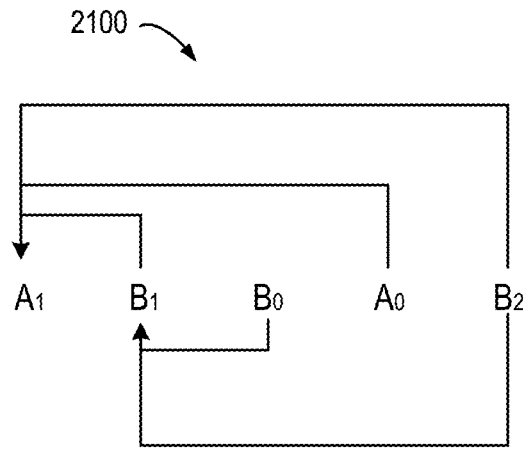
FIG. 21 shows candidate pairs considered for redundancy check of spatial merge candidates.

The derivation of spatial merge candidates in VVC is same to that in HEVC except the positions of first two merge candidates are swapped. FIG. 20 is a schematic diagram 2000 illustrating positions of a spatial merge candidate. A maximum of four merge candidates are selected among candidates located in the positions depicted in FIG. 20. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 21 is a schematic diagram 2100 illustrating candidate pairs considered for redundancy check of spatial merge candidates. Instead only the pairs linked with an arrow in FIG. 21 are considered and a candidate is only added to the list if the corresponding candidate used for redundancy check has not the same motion information.

2.12.2. Temporal Candidates Derivation

Figure 22:
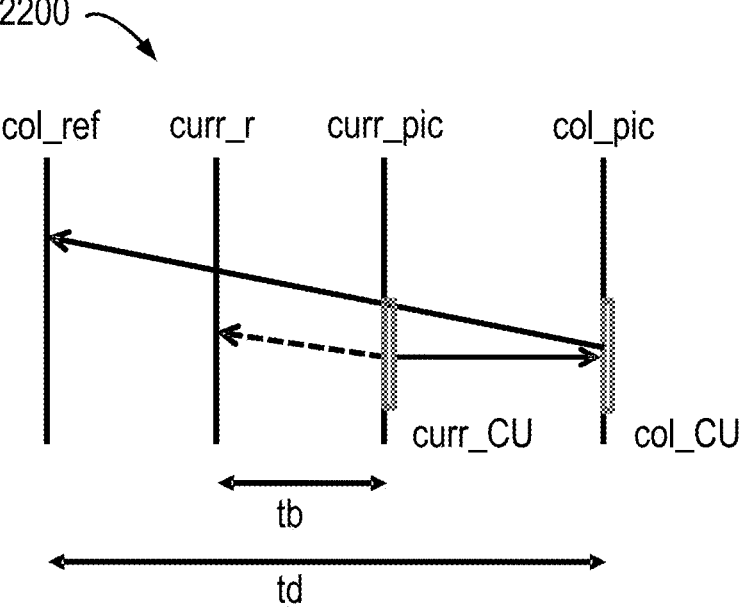
FIG. 22 illustrates motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in the diagram 2200 of FIG. 22, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 23:
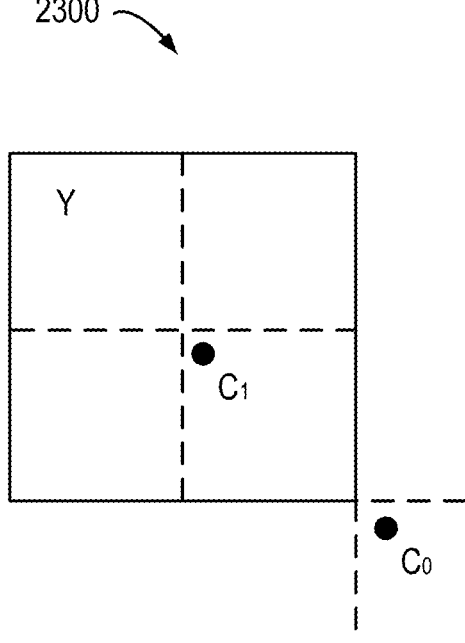
FIG. 23 shows candidate positions for temporal merge candidate, C0 and C1.

FIG. 23 is a schematic diagram 2300 illustrating candidate positions for temporal merge candidate, $C_0$ and $C_1$. The position for the temporal candidate is selected between candidates $C_0$ and $C_1$, as depicted in FIG. 23. If CU at position $C_0$ is not available, is intra coded, or is outside of the current row of CTUs, position $C_1$ is used. Otherwise, position $C_0$ is used in the derivation of the temporal merge candidate.

2.12.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

Number of HMPV candidates is used for merge list generation is set as (N<=4) ? M: (8−N), wherein N indicates number of existing candidates in the merge list and M indicates number of available HMVP candidates in the table.

Once the total number of available merge candidates reaches the maximally allowed merge candidates minus 1, the merge candidate list construction process from HMVP is terminated.

2.12.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.12.5. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

2.13. New Merge Candidates 2.13.1. Non-Adjacent Merge Candidates Derivation

Figure 24:
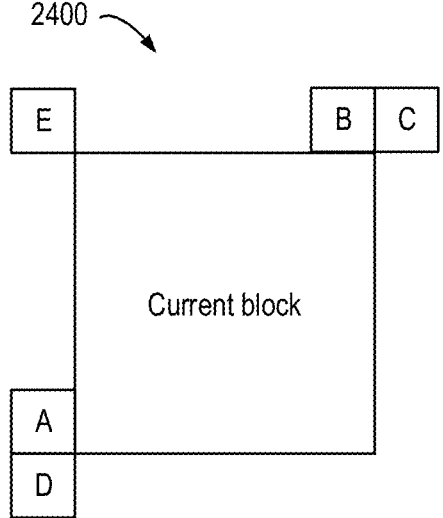
FIG. 24 shows a schematic diagram of VVC spatial neighboring blocks of the current block.

FIG. 24 illustrates a schematic diagram 2400 of VVC spatial neighboring blocks of the current block. In VVC, five spatially neighboring blocks shown in FIG. 24 as well as one temporal neighbor are used to derive merge candidates.

It is proposed to derive the additional merge candidates from the positions non-adjacent to the current block using the same pattern as that in VVC. To achieve this, for each search round i, a virtual block is generated based on the current block as follows:

First, the relative position of the virtual block to the current block is calculated by:

$$Offsetx = -i \times gridX, Offsety = -i \times gridY$$

where the Offsetx and Offsety denote the offset of the top-left corner of the virtual block relative to the top-left corner of the current block, gridX and gridY are the width and height of the search grid.

Second, the width and height of the virtual block are calculated by:

$$newWidth = i \times 2 \times gridX + currWidth$$

$$newHeight = i \times 2 \times gridY + currHeight.$$

where the currWidth and currHeight are the width and height of current block. The newWidth and newHeight are the width and height of new virtual block.

gridX and gridY are currently set to currWidth and currHeight, respectively.

FIG. 25 illustrates a schematic diagram of a virtual block in the ith search round, which shows the relationship between the virtual block and the current block.

After generating the virtual block, the blocks $A_i$, $B_i$, $C_i$, $D_i$ and $E_i$ can be regarded as the VVC spatial neighboring blocks of the virtual block and their positions are obtained with the same pattern as that in VVC. Obviously, the virtual block is the current block if the search round i is 0. In this case, the blocks $A_i$, $B_i$, $C_i$, $D_i$ and $E_i$ are the spatially neighboring blocks that are used in VVC merge mode.

When constructing the merge candidate list, the pruning is performed to guarantee each element in merge candidate list to be unique. The maximum search round is set to 1, which means that five non-adjacent spatial neighbor blocks are utilized.

Non-adjacent spatial merge candidates are inserted into the merge list after the temporal merge candidate in the order of $B_1 \rightarrow A_1 \rightarrow C_1 \rightarrow D_1 \rightarrow E_1$.

2.13.2. STMVP

It is proposed to derive an averaging candidate as STMVP candidate using three spatial merge candidates and one temporal merge candidate.

STMVP is inserted before the above-left spatial merge candidate.

The STMVP candidate is pruned with all the previous merge candidates in the merge list.

For the spatial candidates, the first three candidates in the current merge candidate list are used.

For the temporal candidate, the same position as VTM/HEVC collocated position is used.

For the spatial candidates, the first, second, and third candidates inserted in the current merge candidate list before STMVP are denoted as F, S, and, T.

The temporal candidate with the same position as VTM/HEVC collocated position used in TMVP is denoted as Col.

The motion vector of the STMVP candidate in prediction direction X (denoted as mvLX) is derived as follows:

1) If the reference indices of the four merge candidates are all valid and are all equal to zero in prediction direction X (X=0 or 1), $$mvLX = (mvLX\_F + mvLX\_S + mvLX\_T + mvLX\_Col) >> 2.$$

2) If reference indices of three of the four merge candidates are valid and are equal to zero in prediction direction X (X=0 or 1), $$mvLX = (mvLX\_F \times 3 + mvLX\_S \times 3 + mvLX\_Col \times 2) >> 3 \text{ or}$$

$$mvLX = (mvLX\_F \times 3 + mvLX\_T \times 3 + mvLX\_Col \times 2) >> 3 \text{ or}$$

$$mvLX = (mvLX\_S \times 3 + mvLX\_T \times 3 + mvLX\_Col \times 2) >> 3.$$

3) If reference indices of two of the four merge candidates are valid and are equal to zero in prediction direction X (X=0 or 1), $$mvLX = (mvLX\_F + mvLX\_Col) >> 1 \text{ or}$$

$$mvLX = (mvLX\_S + mvLX\_Col) >> 1 \text{ or}$$

-continued $$mvLX = (mvLX\_T + mvLX\_Col) >> 1.$$

Note: If the temporal candidate is unavailable, the STMVP mode is off.

2.13.3. Merge List Size

If considering both non-adjacent and STMVP merge candidates, the size of merge list is signalled in sequence parameter set header and the maximum allowed size of merge list is 8.

3. Problems

In current design of bi-directional optical flow (BDOF) in VVC, the optical flow is not accurate due to its granularity and not smooth at the sub-block boundary. The new optical flow derivation method is proposed in this disclosure, which will solve the accuracy and continuity of optical flow motion field.

4. Embodiments of the Present Disclosure

The bi-directional prediction can be improved if we can improve the accuracy of each sample's optical flow. Two different sample-based optical flow generation method are proposed in this disclosure: (1) motion filed interpolation using coarse optical flow filed; (2) affine motion-model based method to derive sample based optical flow.

4.1. Embodiments

The detailed embodiments below should be considered as examples to explain general concepts. These embodiments should not be interpreted in a narrow way. Furthermore, these embodiments can be combined in any manner.

In this disclosure, the term optical flow may refer to motion vector.

On the Derivation Method of Sample Based Optical Flow Using the Filtered Results of Sub-Block's Optical Flow 1. It is proposed to apply a filtering process (e.g., an interpolation) on the sub-block's optical flow field (or motion field) in optical flow based coding methods.
   a. In one example, the filtering process is applied to derive sample based optical flow (or motion vector).
   b. In one example, the optical flow based coding method may be the BDOF/PROF or variances of BDOF/PROF.
   c. In one example, the interpolation filter can be applied by using the optical flow of sample's current sub-block and its neighboring sub-blocks' optical flow.
      i. In one example, the interpolation filter coefficient is distance based.
         1) In one example, the distance may refer to the distance between current sample and one or more positions (e.g., centers) of current sub-block and/or neighboring blocks.
      ii. In one example, the bilinear interpolation filter can be used.
      iii. In one example, the neighboring sub-blocks may be adjacent and/or non-adjacent to current sub-block.
      iv. In one example, which neighboring sub-blocks (e.g., the number of neighboring sub-blocks) are involved in the interpolation may be signalled, or derived on-the-fly, or pre-defined.
         1) In one example, the optical flow of current sub-block and at least one of its eight neighboring sub-blocks may be involved in the interpolation. An example is shown in FIG. 26(*a*).
         2) In another example, the optical flow of current sub-block and its four neighboring sub-blocks (i.e., left, above, right, and below) are involved in the interpolation. An example is shown in FIG. 26(*b*).
         3) In one example, the optical flow of current sub-block and at least one neighboring sub-block which has already been coded/decoded may be involved in the interpolation.
         4) In another example, the number of neighboring sub-blocks and/or which sub-blocks are used in the interpolation may depend on coding information (e.g., block size/dimensions, inter coding mode, slice/picture type).
            a) In one example, X1 neighbouring sub-blocks are involved in the interpolation when current block size is larger than T, and X2 neighbouring sub-blocks are involved in the interpolation when current block size is smaller than or equal to T, such as X1=8, X2=4,T=256.
      v. In one example, which neighboring sub-blocks (e.g., the number of neighboring sub-blocks) are involved in the interpolation for one or more samples may depend on the positions of the samples in current sub-block.
         1) In one example, when one or more samples locate in the left-above region of current sub-block, left, and/or left-above, and/or above neighboring sub-blocks may be involved in the interpolation to derive the optical flows of the samples. An example is shown in FIG. 27(*a*).
         2) In one example, when one or more samples locate in the right-above region of current sub-block, above, and/or right-above, and/or right neighboring sub-blocks may be involved in the interpolation to derive the optical flows of the samples. An example is shown in FIG. 27(*b*).
         3) In one example, when one or more samples locate in the left-bottom region of current sub-block, left, and/or left-below, and/or below neighboring sub-blocks may be involved in the interpolation to derive the optical flows of the samples. An example is shown in FIG. 27(*c*).
         4) In one example, when one or more samples locate in the right-bottom region of current sub-block, right, and/or right-below, and/or below neighboring sub-blocks may be involved in the interpolation to derive the optical flows of the samples. An example is shown in FIG. 27(*d*).
      vi. In one example, when one or more neighboring sub-blocks are outside of the current coding block, the neighboring sub-blocks may not be involved in the interpolation.
         1) In one example, only neighboring sub-blocks in the current coding block may be involved in the interpolation.
2. Deriving the boundary sub-block's optical flow outside of the current coding block.
   a. In one example, the sub-block's optical flow outside the coding block is repetitively copied from its nearest neighboring sub-block.

b. In one example, the sub-block's optical flow outside the coding block is set equal to the optical flow of the sub-block at a certain location, such as the center of current coding block.

c. In one example, the sub-block's optical flow outside the coding block is set equal to zero.

d. In one example, the sub-block's optical flow outside the coding block is derived using the MV of the current coding block.

e. In one example, the sub-block's optical flow outside the coding block may be derived using the optical flow of neighboring coding block, or the optical flow of neighboring coding sub-block when the neighboring coding block is coded at sub-block level.

On the Derivation Method of Sample Based Optical Flow Using Affine Motion Model

3. The sample based optical flow is derived with an affine motion model for each sub-block.

a. In one example, the affine motion model can be 6-parameter or 4-parameter model.

b. In one example, the affine motion model is derived with the least square optimization method with temporal predictions and spatial gradients.

i. In one example, partial or all samples of the sub-block may be used to derive the affine motion model (e.g., calculation of the spatial gradients).

c. In one example, the affine motion model is derived within an overlapped window covering the current sub-block and parts of its neighboring sub-blocks.

i. In one example, the overlapped window size may be signalled in the bitstream, or derived on-the-fly, or pre-defined, or dependent on coding information.

1) In one example, the overlapped window size may depend on block size, and/or slice/picture type, and/or temporal layer.

2) In one example, the overlapped window size may equal to 2, or 4, or 6.

d. In one example, the optical flow of those samples at sub-block boundaries is refined with a weighted averaging of the optical flow derived from the current sub-block's affine motion model and the optical flow derived from its neighboring sub-block's affine motion model.

i. In one example, one or more lines of samples at sub-block boundaries may be refined.

e. In one example, the optical flow of those samples at coding block boundaries may be refined with a weighted averaging of the optical flow derived from the current sub-block's affine motion model and the optical flow derived from neighbouring coding blocks.

i. Alternatively, the optical flow of those samples at coding block boundaries may be not refined.

f. In one example, whether to and/or how to refine the optical flow of those samples at coding block boundaries may depend on whether a neighbouring block is affine-coded.

On the Determination of Applying Sample Based Optical Flow Coding Method

4. The determination of applying sample based optical flow coding method may depend on the difference of two predictors from two directions with its block's motions.

a. In one example, the sample optical flow method is not applied to the current coding block if two predictors of the current coding block with block's motion are similar.

b. In one example, the sample optical flow method is not applied for the current sub-block if its two initial predictors with block's motion are similar.

5. The determination of applying sample based optical flow coding method may depend on the difference of two motion vectors from two reference lists.

6. The determination of applying sample based optical flow coding method may depend on the signaled flag at sequence level, picture level, slice level, or coding unit level.

7. The determination of applying sample based optical flow coding method may depend on another coding tool (e.g., inter coding tool).

a. In one example, the determination of applying sample based optical flow coding method may depend on a cost calculated during the process of DMVR or multi-pass DMVR.

General Claims

8. In above examples, the sample based optical flow may be replaced by a unit-based optical flow wherein the unit size is no greater than the sub-block.

9. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

10. Whether to and/or how to apply the disclosed methods above may be signalled at PB/TB/CB/PU/TU/CU/VPDU/CTU/CTU row/slice/tile/sub-picture/other kinds of region contains more than one sample or pixel.

11. Whether to and/or how to apply the disclosed methods above may be dependent on coded information, such as block size, colour format, single/dual tree partitioning, colour component, slice/picture type.

4.2. Interpolation to Derive Sample Based Optical Flow

For the first method, the optical flow for each sub-block in one coding block is derived with the optical flow derivation method specified in VVC, which is also treated as a coarse optical flow field. In the second step, a finer optical flow field is derived for each sample based on interpolation using the coarse optical flow field. As shown in FIG. 4-3, $MV_{sx,sy}$ is the optical flow of sub-block (sx, sy) in a 16×16 coding block. The dashed arrow in red is the interpolated sample-based optical flow. These sub-block's optical flow can be derived with the method specified in VVC. The sample based optical flow is derived with a bi-linear interpolation using neighboring sub-block's optical flow. For example, $MV_{0,0}$, $MV_{1,0}$, $MV_{0,1}$, and $MV_{1,1}$ are used to interpolate the optical flow of those top-left samples in sub-block (1,1) based on the distance to those four MVs. If current sub-block is (sx, sy), its eight neighboring sub-blocks are (sx−1, sy−1), (sx, sy−1), (sx+1, sy−1), (sx−1, sy), (sx+1, sy), (sx−1, sy+1), (sx, sy+1), (sx+1, sy+1). If the sample (x, y) within the coding block belonging to the top-left part of the current sub-block (sx, sy), the equation used to interpolate sample based optical flow is as follows. K is the sub-block size, e.g. 4. Norm is a normalization factor being equal to (K×K).

$$MV^h_{sx,sy}$$

33 and $$MV_{sx,sy}^v$$

are the horizontal and vertical component of sub-block's optical flow, respectively.

$$MV_{x,y}^h = \frac{1}{Norm}*\left(\left(sy*K+\frac{K}{2}-y\right)*\right.$$
$$\left(\left(sx*K+\frac{K}{2}-x\right)*MV_{sx-1,sy-1}^h+\left(x-sx*K+\frac{K}{2}\right)*MV_{sx,sy-1}^h\right)+\left(y-\right.$$
$$\left.sy*K+\frac{K}{2}\right)*\left(\left(sx*K+\frac{K}{2}-x\right)*MV_{sx-1,sy}^h+\left(x-sx*K+\frac{K}{2}\right)*MV_{sx,sy}^h\right)\right)$$

$$MV_{x,y}^v = \frac{1}{Norm}*\left(\left(sy*K+\frac{K}{2}-y\right)*\left(sx*K+\frac{K}{2}-x\right)*MV_{sx-1,sy-1}^v+\right.$$
$$\left(x-sx*K+\frac{K}{2}\right)*MV_{sx,sy-1}^v\right)+\left(y-sy*K+\frac{K}{2}\right)*$$
$$\left.\left(\left(sx*K+\frac{K}{2}-x\right)*MV_{sx-1,sy}^v+\left(x-sx*K+\frac{K}{2}\right)*MV_{sx,sy}^v\right)\right)$$

If the sample (x, y) belonging to the top-right part of the current sub-block (sx, sy), the equation used to interpolate sample based optical flow is as follows.

$$MV_{x,y}^h = \frac{1}{Norm}\left(\left(sy*K+\frac{K}{2}-y\right)*\left(\left(sx*K+3*\frac{K}{2}-x\right)*MV_{sx,sy-1}^h+\right.\right.$$
$$\left(x-sx*K-\frac{K}{2}\right)*MV_{sx+1,sy-1}^h\right)+\left(y-sy*K+\frac{K}{2}\right)*$$
$$\left.\left(\left(sx*K+3*\frac{K}{2}-x\right)*MV_{sx,sy}^h+\left(x-sx*K-\frac{K}{2}\right)*MV_{sx+1,sy}^h\right)\right)$$

$$MV_{x,y}^v = \frac{1}{Norm}\left(\left(sy*K+\frac{K}{2}-y\right)*\left(\left(sx*K+3*\frac{K}{2}-x\right)*MV_{sx,sy-1}^v+\right.\right.$$
$$\left(x-sx*K-\frac{K}{2}\right)*MV_{sx+1,sy-1}^v\right)+\left(y-sy*K+\frac{K}{2}\right)*$$
$$\left.\left(\left(sx*K+3*\frac{K}{2}-x\right)*MV_{sx,sy}^v+\left(x-sx*K-\frac{K}{2}\right)*MV_{sx+1,sy}^v\right)\right)$$

If the sample (x, y) belonging to the bottom-left part of current sub-block (sx, sy), the equation used to interpolate sample based its optical flow is as follows.

$$MV_{x,y}^h = \frac{1}{Norm}*\left(\left(sy*K+3*\frac{K}{2}-y\right)*\left(\left(sx*K+\frac{K}{2}-x\right)*MV_{sx-1,sy}^h+\right.\right.$$
$$\left(x-sx*K+\frac{K}{2}\right)*MV_{sx,sy}^h\right)+\left(y-sy*K-\frac{K}{2}\right)*$$
$$\left.\left(\left(sx*K+\frac{K}{2}-x\right)*MV_{sx-1,sy+1}^h+\left(x-sx*K+\frac{K}{2}\right)*MV_{sx,sy+1}^h\right)\right)$$

$$MV_{x,y}^v = \frac{1}{Norm}*\left(\left(sy*K+3*\frac{K}{2}-y\right)*\left(\left(sx*K+\frac{K}{2}-x\right)*MV_{sx-1,sy}^v+\right.\right.$$
$$\left(x-sx*K+\frac{K}{2}\right)*MV_{sx,sy}^v\right)+\left(y-sy*K-\frac{K}{2}\right)*$$
$$\left.\left(\left(sx*K+\frac{K}{2}-x\right)*MV_{sx-1,sy+1}^v+\left(x-sx*K+\frac{K}{2}\right)*MV_{sx,sy+1}^v\right)\right)$$

If the sample (x, y) belonging to the bottom-right part of the current sub-block (sx, sy), the equation used to interpolate sample based optical flow is as follows.

34

$$MV_{x,y}^h = \frac{1}{Norm}*\left(\left(sy*K+3*\frac{K}{2}-y\right)*\left(\left(sx*K+3*\frac{K}{2}-x\right)*MV_{sx,sy}^h+\right.\right.$$
$$\left(x-sx*K-\frac{K}{2}\right)*MV_{sx+1,sy}^h\right)+\left(y-sy*K-\frac{K}{2}\right)*$$
$$\left.\left(\left(sx*K+3*\frac{K}{2}-x\right)*MV_{sx,sy+1}^h+\left(x-sx*K-\frac{K}{2}\right)*MV_{sx+1,sy+1}^h\right)\right)$$

$$MV_{x,y}^v = \frac{1}{Norm}*\left(\left(sy*K+3*\frac{K}{2}-y\right)*\left(\left(sx*K+3*\frac{K}{2}-x\right)*MV_{sx,sy}^v+\right.\right.$$
$$\left(x-sx*K-\frac{K}{2}\right)*MV_{sx+1,sy}^v\right)+\left(y-sy*K-\frac{K}{2}\right)*$$
$$\left.\left(\left(sx*K+3*\frac{K}{2}-x\right)*MV_{sx,sy+1}^v+\left(x-sx*K-\frac{K}{2}\right)*MV_{sx+1,sy+1}^v\right)\right)$$

Figure 28:
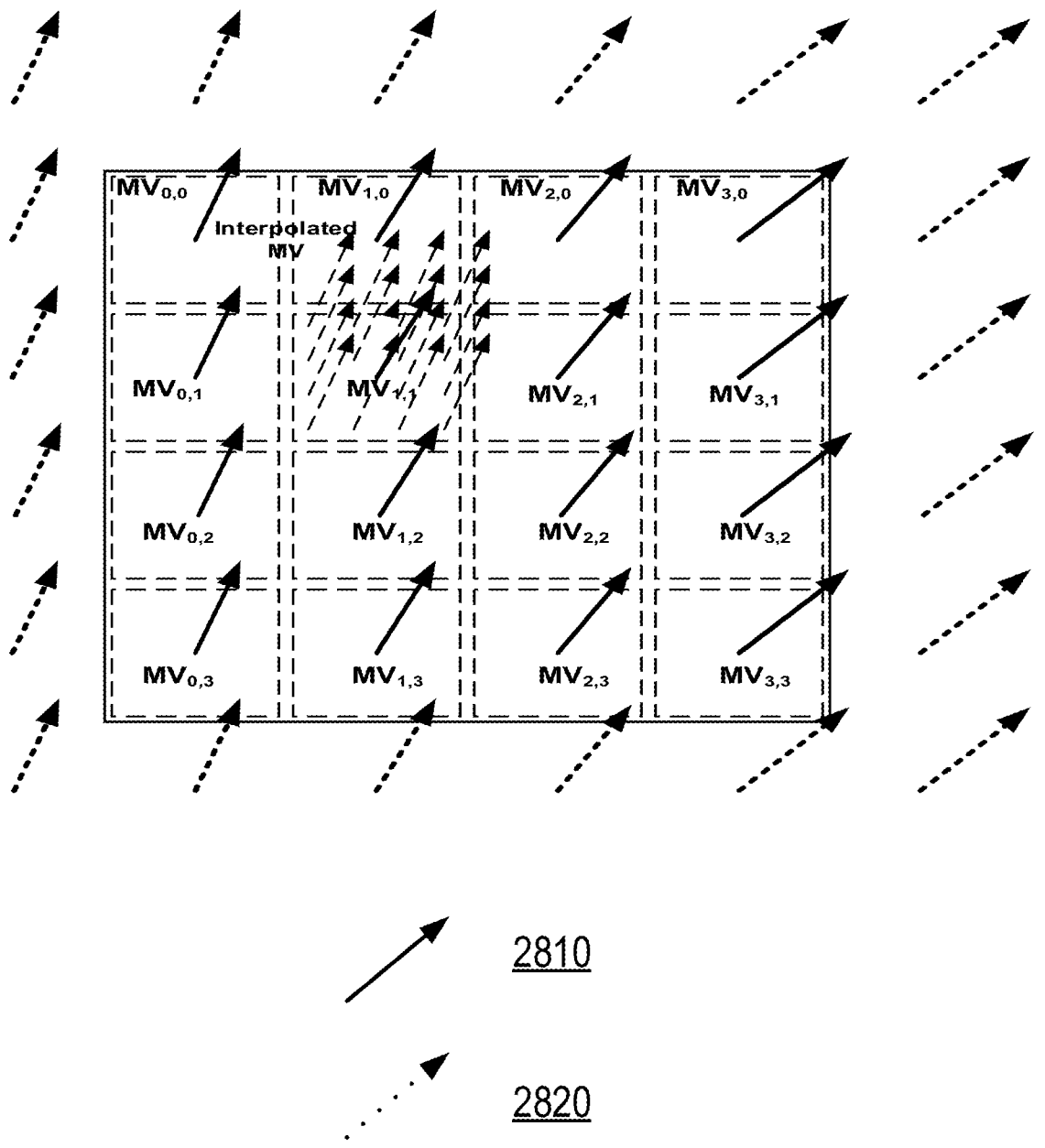
FIG. 28 shows interpolation to generate sample based optical flow in a 16×16 coding block.

At the coding block boundary, its neighboring sub-block's optical flow may not exist. It can be filled with its nearest available neighboring sub-block's optical flow. As shown in FIG. 28, the dashed arrows outside the coding block represent the padded sub-block's optical flow. FIG. 28 shows interpolation to generate sample based optical flow in a 16×16 coding block. The arrow 2810 represents padded sub-block's optical flow. The arrow 2820 inside coding block is the interpolated sample-based optical flow.

4.3. Affine Motion Model to Derive Sample Based Optical Flow

This method is to use an affine motion model to present the optical flow field within a small sub-block inside a coding block. The affine motion model based optical flow can provide a smooth optical flow field within the coding block. First, a sub-block unit (e.g., 4×4) is defined. Inside the sub-block unit, all samples share one affine motion model when the sample based optical flow is derived. The current sample is denoted as I(x, y) where (x, y) is its location inside current block. The current sample has two predictors derived from motion compensation with the coding block's motion information from two reference picture lists: list-0 (forward) and list-1 (backward), and they are denoted as $P_0(x, y)$, $P_1(x, y)$. The optical flow of sample at (x, y) relative to its predictor $P_0$ is denoted as V(x, y) which consists of two components $\{V_h(x, y), V_v(x, y)\}$ in the horizontal and vertical directions, respectively. Assuming the local motion is smooth in a short period, the optical flow relative to its predictor $P_1$ can be presented as −V(x, y). The BDOF design has the same assumption. The spatial gradient of $P_0(x, y)$ is denoted as $$\{G_h^0(x, y), G_v^0(x, y)\}$$

and the spatial gradient of $P_1(x, y)$ is denoted as $$\{G_h^1(x, y), G_v^1(x, y)\}.$$

The spatial gradient can be derived in the same way as BDOF in section 2.5. The optical flow equations can be presented as follows.

$$\begin{cases} I(x, y) = P_0(x, y) + G_h^0(x, y)*V_h(x, y) + G_v^0(x, y)*V_v(x, y) \\ I(x, y) = P_1(x, y) - G_h^1(x, y)*V_h(x, y) - G_v^1(x, y)*V_v(x, y) \end{cases} \quad (4\text{-}1)$$

$\{V_h(x, y), V_v(x, y)\}$ can be presented as an affine motion model. In general, suppose the affine motion model for the sub-block which the sample (x, y) belongs to is a 6-parameter motion model, $\{a_0, a_1, a_2, a_3, a_4, a_5\}$.

$$\begin{cases} V_h(x, y) = a_0 * x + a_1 * y + a_4 \\ V_v(x, y) = a_2 * x + a_3 * y + a_5 \end{cases} \quad (4\text{-}2)$$

Using Equation (4-2) to substitute $V_h(x,y)$ and $V_v(x,y)$ in Equation (4-1) and removing I(x,y), we get the following equation:

$$P_1(x, y) - P_0(x, y) = \left(G_h^0(x, y) + G_h^1(x, y)\right) * V_h(x, y) + \left(G_v^0(x, y) + \quad (4\text{-}3) \right.$$
$$G_v^1(x, y)\right) * V_v(x, y) = \left(\left(G_h^0(x, y) + G_h^1(x, y)\right) * x\right) * a_0 + \left(\left(G_h^0(x, y) + \right.\right.$$
$$G_h^1(x, y)\right) * y\right) * a_1 + \left(\left(G_v^0(x, y) + G_v^1(x, y)\right) * x\right) * a_2 +$$
$$\left(\left(G_v^0(x, y) + G_v^1(x, y)\right) * y\right) * a_3 + \left(G_h^0(x, y) + G_h^1(x, y)\right) * a_4 +$$
$$\left(G_v^0(x, y) + G_v^1(x, y)\right) * a_5.$$

The affine model parameter can be solved using the least square method based on Equation (4-3) given two predictors and spatial gradients. If the following constraint is applied, the 6-parameter affine model is degraded to 4-parameter model.

$$\begin{cases} a_0 = a_3 \\ a_1 = -a_2 \end{cases}$$

After the affine model $\{a_0, a_1, a_2, a_3, a_4, a_5\}$ is derived, the optical flow of each sample inside the sub-block can be calculated by Equation (4-2). The prediction with sample based optical flow refinement can be calculated as.

$$I(x, y) = P_0(x, y) + P_1(x, y))/2 +$$
$$\left(G_h^0(x, y) - G_h^1(x, y)\right) * V_h(x, y)/2 + \left(G_v^0(x, y) - G_v^1(x, y)\right) * V_v(x, y)/2$$

The conventional bi-prediction without optical flow refinement is:

$$I(x, y) = (P_0(x, y) + P_1(x, y))/2.$$

Averaging these two predictions with a weighting factor w, the final prediction can be presented as follows, where w is in the range of [0, 1]. For example, the factor w may be set as ½.

$$I(x, y) = (P_0(x, y) + P_1(x, y))/2 + \left(G_h^0(x, y) - G_h^1(x, y)\right) * V_h(x, y) * w/2 +$$
$$\left(G_v^0(x, y) - G_v^1(x, y)\right) * V_v(x, y) * w/2$$

If each sub-block derives its own affine motion model independently, there is probably a discontinuity in sample based optical flow field at the sub-block boundary at each side. To reduce the change of sample's optical flow at the block boundary at each side, two methods are applied. (1) Using overlapped window to derive affine motion model.

For example, if the sub-block size is 4×4, the overlapped window can be 6×6. Each side has one sample overlapped with its neighboring sub-block. (2) After we calculate each sample's optical flow, the optical flow of those samples at the sub-block boundaries will be refined by a weighted averaging with the optical flow derived from its neighboring sub-block's affine motion model. For example, $\{V_h(x, y),V_v(x,y)\}$ is the optical flow at boundary position (x, y) derived with current sub-block's affine motion model. $\{V'_h(x, y),V'_v(x, y)\}$ is the optical flow at same location (x, y) but derived with its neighboring sub-block's affine motion model. The refined optical flow $\{V''_h(x, y), V''_v(x, y)\}$ is refined as:

$$\begin{cases} V''_h(x, y) = V_h(x, y) * 3/4 + V'_h(x, y) * 1/4 \\ V''_v(x, y) = V_v(x, y) * 3/4 + V'_v(x, y) * 1/4 \end{cases} \quad (4\text{-}4)$$

The neighboring can be left, top, right or bottom neighboring sub-block depending on the boundary side to which the boundary sample belongs. For example, if the sample is located at the left boundary, its left neighboring sub-block is used for the refinement.

Embodiments of the present disclosure are related to motion candidate list construction.

As used herein, the term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular. As used herein, the term "optical flow" may refer to motion vector.

Figure 29:
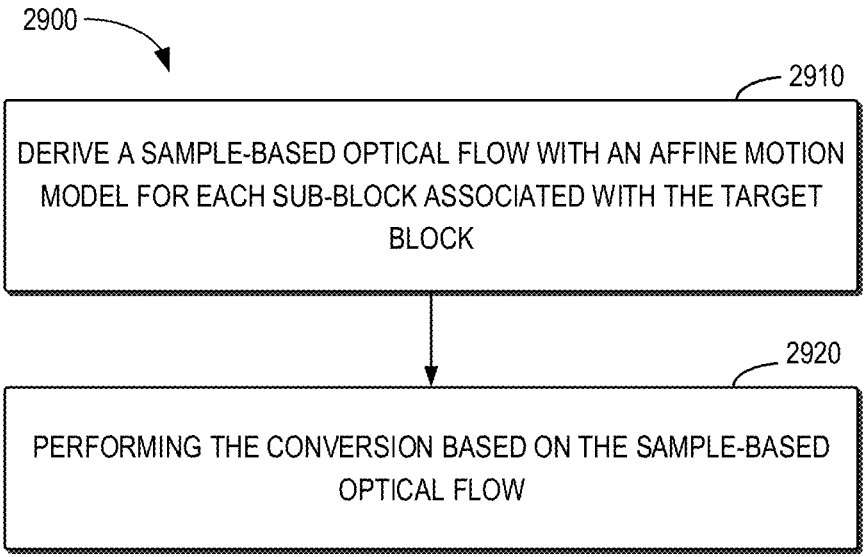
FIG. 29 shows a flow chart of an example method according to embodiments of the present disclosure.

FIG. 29 illustrates a flowchart of a method 2900 for video processing in accordance with some embodiments of the present disclosure. The method 2900 may be implemented during a conversion between a target block and a bitstream of the target block.

As shown in FIG. 29, at block 2910, during a conversion between a target block of a video and a bitstream of the target block, a sample-based optical flow is derived with an affine motion model for each sub-block associated with the target block. In one example, the affine motion model can be 6-parameter or 4-parameter model.

At block 2920, the conversion is performed based on the sample-based optical flow. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the affine motion model is derived with a least square optimization method with temporal predictions and spatial gradients. In some embodiments, at least a part of samples of a sub-block are used to derive the affine motion model. In one example, partial or all samples of the sub-block may be used to derive the affine motion model (e.g., calculation of the spatial gradients). For example, the at least a part of samples of a sub-block may be used for a determination of the spatial gradients.

In some embodiments, the affine motion model may be derived with an overlapped window covering a current sub-block and a part of neighboring sub-blocks of the current sub-block. In some embodiments, a size of the overlapped window may be indicated in the bitstream. In some embodiments, the size of the overlapped window may be derived on-the-fly. In some embodiments, the size of the overlapped window may be dependent on coding information. For example, the size of the overlapped window may be dependent on at least one of: a block size, a slice type, a picture type, or a temporal layer. In some embodiments, the size of the overlapped window may be one of: 2, 4, or 6.

In some embodiments, the optical flow of samples at a sub-block boundary may be refined with a weighted averaging of a first optical flow derived from a first affine motion model of a current sub-block and a second optical flow derived from a second affine motion model of neighboring sub-blocks of the current sub-block. In one example, the optical flow of those samples at sub-block boundaries is refined with a weighted averaging of the optical flow derived from the current sub-block's affine motion model and the optical flow derived from its neighboring sub-block's affine motion model. In some embodiments, at least one line of samples at the sub-block boundary is refined. For example, one or more lines of samples at sub-block boundaries may be refined.

In some embodiments, the optical flow of samples at a coding block boundary may be refined with a weighted averaging of a first optical flow derived from a first affine motion model of a current sub-block and a second optical flow derived from a second affine motion model of neighboring sub-blocks of the current sub-block. In one example, the optical flow of those samples at coding block boundaries may be refined with a weighted averaging of the optical flow derived from the current sub-block's affine motion model and the optical flow derived from neighbouring coding blocks. Alternatively, the optical flow of samples at a coding block boundary may not be refined. In some embodiments, whether to and/or how to refine the optical flow of samples at a coding block boundary may depend on whether a neighboring block is affine-coded. In above embodiments, the sample based optical flow may be replaced by a unit-based optical flow wherein the unit size is no greater than the sub-block.

In some embodiments, an indication of whether to and/or how to derive the sample-based optical flow may be indicated at one of the followings: a sequence level, a group of pictures level, a picture level, a slice level, or a tile group level.

In some embodiments, an indication of whether to and/or how to derive the sample-based optical flow may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to derive the sample-based optical flow may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to derive the sample-based optical flow may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may comprise: deriving a sample-based optical flow with an affine motion model for each sub-block associated with a target block of the video; and generating a bitstream of the target block based on the sample based optical flow.

In some embodiments, a method for storing bitstream of a video may comprise: deriving a sample-based optical flow with an affine motion model for each sub-block associated with a target block of the video; generating a bitstream of the target block based on the sample based optical flow; and storing the bitstream in a non-transitory computer-readable recording medium.

Figure 30:
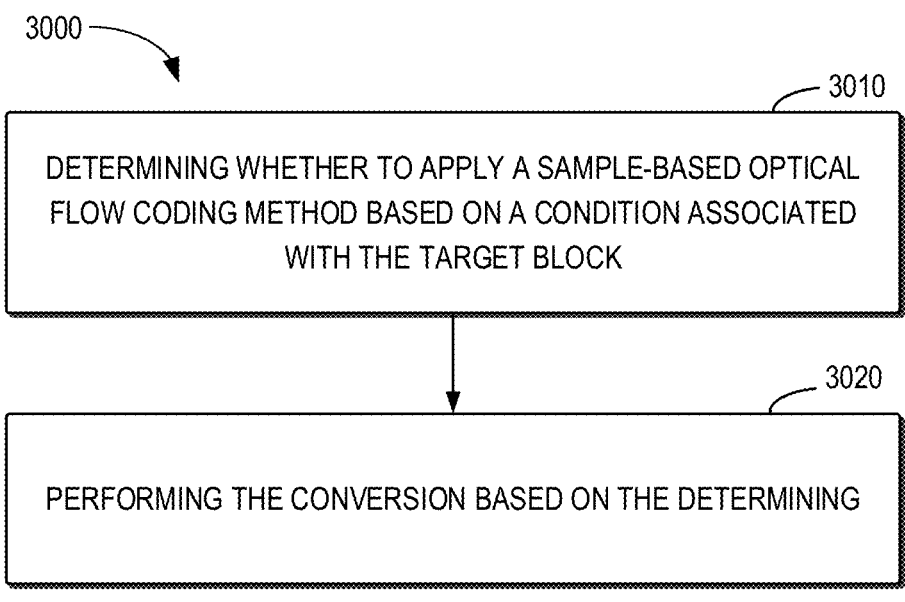
FIG. 30 shows a flow chart of an example method according to embodiments of the present disclosure.

FIG. 30 illustrates a flowchart of a method 3000 for video processing in accordance with some embodiments of the present disclosure. The method 3000 may be implemented during a conversion between a target block and a bitstream of the target block.

As shown in FIG. 30, at block 3010, during a conversion between a target block of a video and a bitstream of the target block, whether to apply a sample-based optical flow coding method is determined based on a condition associated with the target block.

At block 3020, the conversion is performed based on the determining. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the determination of applying the sample-based optical flow coding method may depend on a difference of two predictors from two directions with motions of the two predictors. The determination of applying sample based optical flow coding method may depend on the difference of two predictors from two directions with its block's motions. In one example, the sample optical flow method may not be applied to a current coding block if the difference is below a threshold. In one example, the sample optical flow method is not applied to the current coding block if two predictors of the current coding block with block's motion are similar. In one example, the sample optical flow method may not be applied for a current sub-block if the difference is below a threshold. In one example, the sample optical flow method is not applied for the current sub-block if its two initial predictors with block's motion are similar.

In some embodiments, the determination of applying the sample-based optical flow coding method may depend on a difference of two motion vectors from two reference lists. In some embodiments, the determination of applying the sample-based optical flow coding method may depend on a flag at one of: a sequence level, a picture level, a slice level, or a coding unit level.

In some embodiments, the determination of applying the sample-based optical flow coding method may depend on another coding tool. For example, the other coding tool may be an inter coding tool. In some embodiments, the determination of applying the sample-based optical flow coding method may depend on a cost that is determined during a process of a decoder side motion vector refinement (DMVR) or multi-pass DMVR.

In above embodiments, the sample based optical flow may be replaced by a unit-based optical flow wherein the unit size is no greater than the sub-block.

In some embodiments, an indication of whether to and/or how to determine applying the sample-based optical flow coding method is indicated at one of the followings: a sequence level, a group of pictures level, a picture level, a slice level, or a tile group level.

In some embodiments, an indication of whether to and/or how to determine applying the sample-based optical flow coding method is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine applying the sample-based optical flow coding method is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine applying the sample-based optical flow coding method may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may comprise: determining whether to apply a sample-based optical flow coding method based on a condition associated with a target block of the video; and generating a bitstream of the target block based on the determining.

In some embodiments, a method for storing bitstream of a video, may comprise: determining whether to apply a sample-based optical flow coding method based on a condition associated with a target block of the video; generating a bitstream of the target block based on the determining; and storing the bitstream in a non-transitory computer-readable recording medium.

Figure 31:
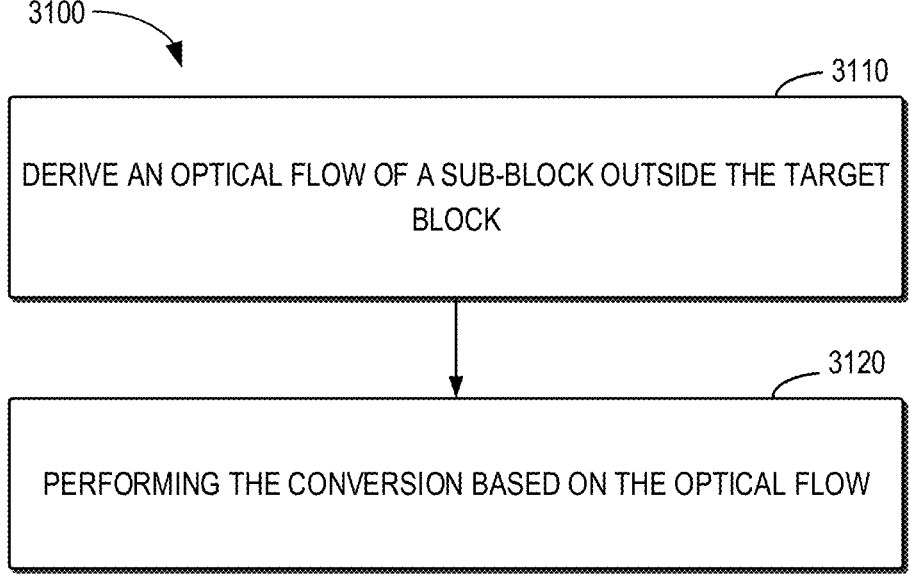
FIG. 31 shows a flow chart of an example method according to embodiments of the present disclosure.

FIG. 31 illustrates a flowchart of a method 3100 for video processing in accordance with some embodiments of the present disclosure. The method 3100 may be implemented during a conversion between a target block and a bitstream of the target block.

As shown in FIG. 31, at block 3110, during a conversion between a target block of a video and a bitstream of the target block, an optical flow of a sub-block outside of the target block is derived.

At block 3120, the conversion is performed based on the optical flow. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the optical flow of the sub-block outside the target block may be repetitively copied from a nearest neighboring sub-block of the sub-block. In some embodiments, the optical flow of the sub-block outside the target block may be derived using a motion vector of a current coding block. In some embodiments, the optical flow of the sub-block outside the target block may be set equal to an optical flow of the sub-block at a certain location. In some embodiments, the optical flow of the sub-block outside the target block is set equal to zero. In some embodiments, the optical flow of the sub-block outside the target block is derived using an optical flow of a neighboring coding block. Alternatively, the optical flow of the sub-block outside the target block may be derived using an optical flow of neighboring coding sub-block if the neighboring coding block is coded at sub-block level.

In above embodiments, the sample based optical flow may be replaced by a unit-based optical flow wherein the unit size is no greater than the sub-block.

In some embodiments, an indication of whether to and/or how to derive the optical flow of the sub-block outside of the target block is indicated at one of the followings: sequence level, group of pictures level, picture level, slice level, or tile group level.

In some embodiments, an indication of whether to and/or how to derive the optical flow of the sub-block outside of the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to derive the optical flow of the sub-block outside of the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to derive the optical flow of the sub-block outside of the target block may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may comprise deriving, during a conversion between a target block of a video and a bitstream of the target block, an optical flow of a sub-block outside of a target block of the video; and generating a bitstream of the target block based on the optical flow.

In some embodiments, a method for storing bitstream of a video, comprise: deriving, during a conversion between a target block of a video and a bitstream of the target block, an optical flow of a sub-block outside of a target block of the video; generating a bitstream of the target block based on the optical flow; and storing the bitstream in a non-transitory computer-readable recording medium.

Figure 32:
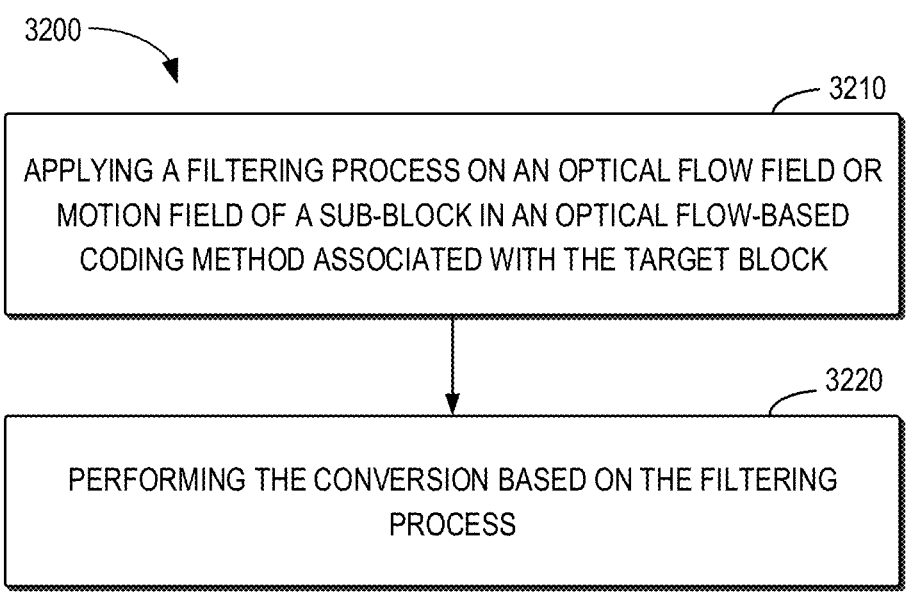
FIG. 32 shows a flow chart of an example method according to embodiments of the present disclosure.

FIG. 32 illustrates a flowchart of a method 3200 for video processing in accordance with some embodiments of the present disclosure. The method 3200 may be implemented during a conversion between a target block and a bitstream of the target block.

As shown in FIG. 32, at block 3210, during a conversion between a target block of a video and a bitstream of the target block, a filtering process is applied on an optical flow field or motion field of a sub-block in an optical flow-based coding method associated with the target block. In one example, a filtering process (e.g., an interpolation) may be applied on the sub-block's optical flow field (or motion field) in optical flow based coding methods.

At block 3220, the conversion is performed based on the filtering process. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the filtering process may be applied to derive a sample based optical flow or a sample based motion vector. For example, the optical flow based coding method may be one of: a bi-directional optical flow (BDOF), a prediction refinement with optical flow (PROF), a variance of BDOF, or a variance of PROF.

In some embodiments, an interpolation filter may be applied by using an optical flow of a current sub-block of a sample and an optical flow of neighboring sub-blocks of the current sub-block. In some embodiments, a coefficient of the interpolation filter may be based on a distance. In one example, the distance may refer to a distance between a current sample and one or more positions (for example, centers) of at least one of: a current sub-block or neighboring blocks.

In some embodiments, a bilinear interpolation filter may be used. In some embodiments, the neighboring sub-blocks may be adjacent and/or non-adjacent to a current sub-block.

In some embodiments, which neighboring sub-blocks are involved in an interpolation process is indicated. In some embodiments, which neighboring sub-blocks are involved in the interpolation process is derived on-the-fly. In some embodiments, which neighboring sub-blocks are involved in the interpolation process is pre-defined. In one example, which neighboring sub-blocks (e.g., the number of neighboring sub-blocks) are involved in the interpolation may be signalled, or derived on-the-fly, or pre-defined.

In some embodiments, for example as shown in FIG. 26(a), the optical flow of a current sub-block and at least one of eight neighboring sub-blocks of the current sub-block is involved in the interpolation process. In some embodiments, for example as shown in FIG. 26(b), the optical flow of a current sub-block and four neighboring sub-blocks (i.e., left, above, right, and below) of the current sub-block is involved in the interpolation process.

In some embodiments, the optical flow of a current sub-block and at least one neighboring sub-block of the current sub-block which has been coded or encoded is involved in the interpolation process. In some embodiments, at least one of: the number of neighboring sub-blocks or which sub-blocks are used in the interpolation process depends on coding information. The coding information may comprise one or more of: block size/dimensions, inter coding mode, slice/picture type.

In some embodiments, a first number of neighboring sub-blocks are involved in the interpolation process if a current block size is larger than a threshold, and a second number of neighboring sub-blocks are involved in the interpolation process if the current block size is smaller than or equal to the threshold. In one example, X1 neighbouring sub-blocks are involved in the interpolation when current block size is larger than T, and X2 neighbouring sub-blocks are involved in the interpolation when current block size is smaller than or equal to T. In some embodiments, the first number is 8, the second number is 4, and the threshold is 256.

In some embodiments, which neighboring sub-blocks are involved in the interpolation process for one or more samples depends on positions of the one or more samples in a current sub-block. In one example, which neighboring sub-blocks (e.g., the number of neighboring sub-blocks) are involved in the interpolation for one or more samples may depend on the positions of the samples in current sub-block.

In some embodiments, for example as shown in FIG. 27(a), if the one or more samples locate in a left-above region of the current sub-block, at least one of the followings is involved in the interpolation process to derive an optical flow of the one or more samples: left neighboring sub-blocks, left-above neighboring sub-blocks, or above neighboring sub-blocks.

In some embodiments, for example as shown in FIG. 27(b), if the one or more samples locate in a right-above region of the current sub-block, at least one of the followings is involved in the interpolation process to derive an optical flow of the one or more samples: above neighboring sub-blocks, right-above neighboring sub-blocks, or right neighboring sub-blocks.

In some embodiments, for example as shown in FIG. 27(c), if the one or more samples locate in a left-bottom region of the current sub-block, at least one of the followings is involved in the interpolation process to derive an optical flow of the one or more samples: left neighboring sub-blocks, left-below neighboring sub-blocks, or below neighboring sub-blocks.

In some embodiments, for example as shown in FIG. 27(d), if the one or more samples locate in a right-bottom region of current sub-block, at least one of the followings is involved in the interpolation process to derive an optical flow of the one or more samples: right neighboring sub-blocks, right-above neighboring sub-blocks, or below neighboring sub-blocks.

In some embodiments, if one or more neighboring sub-blocks are outside of a current coding block, the one or more neighboring sub-blocks are not involved in an interpolation process. In one example, only neighboring sub-blocks in the current coding block are involved in the interpolation process.

In above embodiments, the sample based optical flow may be replaced by a unit-based optical flow wherein the unit size is no greater than the sub-block.

In some embodiments, an indication of whether to and/or how to apply the filtering process on the flow field or motion field of sub-block in the optical flow-based coding method is indicated at one of the followings: a sequence level, a group of pictures level, a picture level, a slice level, or a tile group level.

In some embodiments, an indication of whether to and/or how to apply the filtering process on the flow field or motion field of the sub-block in the optical flow-based coding method is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to apply the filtering process on the optical flow field or motion field of the sub-block in the optical flow-based coding method is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to apply the filtering process on the optical flow field or motion field of the sub-block in the optical flow-based coding method may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may comprise applying a filtering process on an optical flow field or motion field of a sub-block in an optical flow-based coding method associated a target block of the video; and generating a bitstream of the target block based on the filtering process.

In some embodiments, a method for storing bitstream of a video, comprises: applying a filtering process on an optical flow field or motion field of a sub-block in an optical flow-based coding method associated a target block of the video; generating a bitstream of the target block based on the filtering process; and storing the bitstream in a non-transitory computer-readable recording medium.

Implementations of the present disclosure can be described in view of the following clauses, the features of which can be combined in any reasonable manner.

Clause 1. A method of video processing, comprising: deriving, during a conversion between a target block of a video and a bitstream of the target block, a sample-based optical flow with an affine motion model for each sub-block associated with the target block; and performing the conversion based on the sample-based optical flow.

Clause 2. The method of clause 1, wherein the affine motion model comprises one of: 6-parameter model, or 4-parameter mode.

Clause 3. The method of clause 1, wherein the affine motion model is derived with a least square optimization method with temporal predictions and spatial gradients.

Clause 4. The method of clause 3, wherein at least a part of samples of a sub-block are used to derive the affine motion model.

Clause 5. The method of clause 4, wherein the at least a part of samples of a sub-block are used for a determination of the spatial gradients.

Clause 6. The method of clause 1, wherein the affine motion model is derived with an overlapped window covering a current sub-block and a part of neighboring sub-blocks of the current sub-block.

Clause 7. The method of clause 6, wherein a size of the overlapped window is indicated in the bitstream, or wherein the size of the overlapped window is derived on-the-fly, or wherein the size of the overlapped window is dependent on coding information.

Clause 8. The method of clause 7, wherein the size of the overlapped window is dependent on at least one of: a block size, a slice type, a picture type, or a temporal layer.

Clause 9. The method of clause 7, wherein the size of the overlapped window is one of: 2, 4, or 6.

Clause 10. The method of clause 1, wherein the optical flow of samples at a sub-block boundary is refined with a weighted averaging of a first optical flow derived from a first affine motion model of a current sub-block and a second optical flow derived from a second affine motion model of neighboring sub-blocks of the current sub-block.

Clause 11. The method of clause 1, wherein at least one line of samples at the sub-block boundary is refined.

Clause 12. The method of clause 1, wherein the optical flow of samples at a coding block boundary is refined with a weighted averaging of a first optical flow derived from a first affine motion model of a current sub-block and a second optical flow derived from a second affine motion model of neighboring sub-blocks of the current sub-block.

Clause 13. The method of clause 1, wherein the optical flow of samples at a coding block boundary is not refined.

Clause 14. The method of clause 1, wherein whether to and/or how to refine the optical flow of samples at a coding block boundary depends on whether a neighboring block is affine-coded.

Clause 15. The method of any of clauses 1-14, wherein an indication of whether to and/or how to derive the sample-based optical flow is indicated at one of the followings: a sequence level, a group of pictures level, a picture level, a slice level, or a tile group level.

Clause 16. The method of any of clauses 1-14, wherein an indication of whether to and/or how to derive the sample-based optical flow is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 17. The method of any of clauses 1-14, wherein an indication of whether to and/or how to derive the sample-based optical flow is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 18. The method of any of clauses 1-14, further comprising: determining, based on coded information of the target block, whether to and/or how to derive the sample-based optical flow, the coded information including at least one of: a block size, a colour format, a single and/or dual tree partitioning, a colour component, a slice type, or a picture type.

Clause 19. A method of video processing, comprising: determining, during a conversion between a target block of a video and a bitstream of the target block, whether to apply a sample-based optical flow coding method based on a condition associated with the target block; and performing the conversion based on the determining.

Clause 20. The method of clause 19, wherein the determination of applying the sample-based optical flow coding method depends on a difference of two predictors from two directions with motions of the two predictors.

Clause 21. The method of clause 20, wherein the sample optical flow method is not applied to a current coding block if the difference is below a threshold.

Clause 22. The method of clause 20, wherein the sample optical flow method is not applied for a current sub-block if the difference is below a threshold.

Clause 23. The method of clause 19, wherein the determination of applying the sample-based optical flow coding method depends on a difference of two motion vectors from two reference lists.

Clause 24. The method of clause 19, wherein the determination of applying the sample-based optical flow coding method depends on a flag at one of: a sequence level, a picture level, a slice level, or a coding unit level.

Clause 25. The method of clause 19, wherein the determination of applying the sample-based optical flow coding method depends on another coding tool.

Clause 26. The method of clause 25, wherein the other coding tool is an inter coding tool.

Clause 27. The method of clause 25, wherein the determination of applying the sample-based optical flow coding method depends on a cost that is determined during a process of a decoder side motion vector refinement (DMVR) or multi-pass DMVR.

Clause 28. The method of any of clauses 19-27, wherein an indication of whether to and/or how to determine applying the sample-based optical flow coding method is indicated at one of the followings: a sequence level, a group of pictures level, a picture level, a slice level, or a tile group level.

Clause 29. The method of any of clauses 19-27, wherein an indication of whether to and/or how to determine applying the sample-based optical flow coding method is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 30. The method of any of clauses 19-27, wherein an indication of whether to and/or how to determine applying the sample-based optical flow coding method is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 31. The method of any of clauses 19-27, further comprising: determining, based on coded information of the target block, whether to and/or how to determine applying the sample-based optical flow coding method, the coded information including at least one of: a block size, a colour format, a single and/or dual tree partitioning, a colour component, a slice type, or a picture type.

Clause 32. A method of video processing, comprising: deriving, during a conversion between a target block of a video and a bitstream of the target block, an optical flow of a sub-block outside of the target block; and performing the conversion based on the optical flow.

Clause 33. The method of clause 32, wherein the optical flow of the sub-block outside the target block is repetitively copied from a nearest neighboring sub-block of the sub-block.

Clause 34. The method of clause 32, wherein the optical flow of the sub-block outside the target block is derived using a motion vector of a current coding block.

Clause 35. The method of clause 32, wherein the optical flow of the sub-block outside the target block is set equal to an optical flow of the sub-block at a certain location.

Clause 36. The method of clause 32, wherein the optical flow of the sub-block outside the target block is set equal to zero.

Clause 37. The method of clause 32, wherein the optical flow of the sub-block outside the target block is derived using an optical flow of a neighboring coding block, or wherein the optical flow of the sub-block outside the target block is derived using an optical flow of neighboring coding sub-block if the neighboring coding block is coded at sub-block level.

Clause 38. The method of any of clauses 32-37, wherein an indication of whether to and/or how to derive the optical flow of the sub-block outside of the target block is indicated at one of the followings: sequence level, group of pictures level, picture level, slice level, or tile group level.

Clause 39. The method of any of clauses 32-37, wherein an indication of whether to and/or how to derive the optical flow of the sub-block outside of the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 40. The method of any of clauses 32-37, wherein an indication of whether to and/or how to derive the optical flow of the sub-block outside of the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 41. The method of any of clauses 32-37, further comprising: determining, based on coded information of the target block, whether to and/or how to derive the optical flow of the sub-block outside of the target block, the coded information including at least one of: a block size, a colour format, a single and/or dual tree partitioning, a colour component, a slice type, or a picture type.

Clause 42. A method of video processing, comprising: applying, during a conversion between a target block of a video and a bitstream of the target block, a filtering process on an optical flow field or motion field of a sub-block in an optical flow-based coding method associated with the target block; and performing the conversion based on the filtering process.

Clause 43. The method of clause 42, wherein the filtering process is applied to derive a sample based optical flow or a sample based motion vector.

Clause 44. The method of clause 42, wherein the optical flow based coding method is one of: a bi-directional optical flow (BDOF), a prediction refinement with optical flow (PROF), a variance of BDOF, or a variance of PROF.

Clause 45. The method of clause 42, wherein an interpolation filter is applied by using an optical flow of a current sub-block of a sample and an optical flow of neighboring sub-blocks of the current sub-block.

Clause 46. The method of clause 45, wherein a coefficient of the interpolation filter is based on a distance.

Clause 47. The method of clause 46, wherein the distance refers to a distance between a current sample and one or more positions of at least one of: a current sub-block or neighboring blocks.

Clause 48. The method of clause 45, wherein a bilinear interpolation filter is used.

Clause 49. The method of clause 45, wherein the neighboring sub-blocks are adjacent and/or non-adjacent to a current sub-block.

Clause 50. The method of clause 45, wherein which neighboring sub-blocks are involved in an interpolation process is indicated, or wherein which neighboring sub-blocks are involved in the interpolation process is derived on-the-fly, or wherein which neighboring sub-blocks are involved in the interpolation process is pre-defined.

Clause 51. The method of clause 50, wherein the optical flow of a current sub-block and at least one of eight neighboring sub-blocks of the current sub-block is involved in the interpolation process.

Clause 52. The method of clause 50, wherein the optical flow of a current sub-block and four neighboring sub-blocks of the current sub-block is involved in the interpolation process.

Clause 53. The method of clause 50, wherein the optical flow of a current sub-block and at least one neighboring sub-block of the current sub-block which has been coded or encoded is involved in the interpolation process.

Clause 54. The method of clause 50, wherein at least one of: the number of neighboring sub-blocks or which sub-blocks are used in the interpolation process depends on coding information.

Clause 55. The method of clause 54, wherein a first number of neighboring sub-blocks are involved in the interpolation process if a current block size is larger than a threshold, and a second number of neighboring sub-blocks are involved in the interpolation process if the current block size is smaller than or equal to the threshold.

Clause 56. The method of clause 55, wherein the first number is 8, the second number is 4, and the threshold is 256.

Clause 57. The method of clause 45, wherein which neighboring sub-blocks are involved in the interpolation process for one or more samples depends on positions of the one or more samples in a current sub-block.

Clause 58. The method of clause 57, wherein if the one or more samples locate in a left-above region of the current sub-block, at least one of the followings is involved in the interpolation process to derive an optical flow of the one or more samples: left neighboring sub-blocks, left-above neighboring sub-blocks, or above neighboring sub-blocks.

Clause 59. The method of clause 57, wherein if the one or more samples locate in a right-above region of the current sub-block, at least one of the followings is involved in the interpolation process to derive an optical flow of the one or more samples: above neighboring sub-blocks, right-above neighboring sub-blocks, or right neighboring sub-blocks.

Clause 60. The method of clause 57, wherein if the one or more samples locate in a left-bottom region of the current sub-block, at least one of the followings is involved in the interpolation process to derive an optical flow of the one or more samples: left neighboring sub-blocks, left-below neighboring sub-blocks, or below neighboring sub-blocks.

Clause 61. The method of clause 57, wherein if the one or more samples locate in a right-bottom region of current sub-block, at least one of the followings is involved in the interpolation process to derive an optical flow of the one or more samples: right neighboring sub-blocks, right-above neighboring sub-blocks, or below neighboring sub-blocks.

Clause 62. The method of clause 45, wherein if one or more neighboring sub-blocks are outside of a current coding block, the one or more neighboring sub-blocks are not involved in an interpolation process.

Clause 63. The method of clause 62, wherein only neighboring sub-blocks in the current coding block are involved in the interpolation process.

Clause 64. The method of any of clauses 42-62, wherein an indication of whether to and/or how to apply the filtering process on the flow field or motion field of sub-block in the optical flow-based coding method is indicated at one of the followings: a sequence level, a group of pictures level, a picture level, a slice level, or a tile group level.

Clause 65. The method of any of clauses 42-62, wherein an indication of whether to and/or how to apply the filtering process on the flow field or motion field of the sub-block in the optical flow-based coding method is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 66. The method of any of clauses 42-62, wherein an indication of whether to and/or how to apply the filtering process on the optical flow field or motion field of the sub-block in the optical flow-based coding method is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 67. The method of any of clauses 42-62, further comprising: determining, based on coded information of the target block, whether to and/or how to apply the filtering process on the optical flow field or motion field of the sub-block in the optical flow-based coding method, the coded information including at least one of: a block size, a colour format, a single and/or dual tree partitioning, a colour component, a slice type, or a picture type.

Clause 68. The method of any of clauses 1-67, wherein the sample-based optical flow is replaced by a unit-based optical flow, wherein a unit size is not greater than a sub-block size.

Clause 69. The method of any of clauses 1-68, wherein the conversion includes encoding the target block into the bitstream.

Clause 70. The method of any of clauses 1-68, wherein the conversion includes decoding the target block from the bitstream.

Clause 71. An apparatus for processing video data comprising a processor and a non-transitory memory with instructions thereon, wherein the instructions upon execution by the processor, cause the processor to perform a method in accordance with any of clauses 1-70.

Clause 72. A non-transitory computer-readable storage medium storing instructions that cause a processor to perform a method in accordance with any of clauses 1-70.

Clause 73. A non-transitory computer-readable recording medium storing a bitstream of a video which is generated by a method performed by a video processing apparatus, wherein the method comprises: deriving a sample-based optical flow with an affine motion model for each sub-block associated with a target block of the video; and generating a bitstream of the target block based on the sample based optical flow.

Clause 74. A method for storing bitstream of a video, comprising: deriving a sample-based optical flow with an affine motion model for each sub-block associated with a target block of the video; generating a bitstream of the target block based on the sample based optical flow; and storing the bitstream in a non-transitory computer-readable recording medium.

Clause 75. A non-transitory computer-readable recording medium storing a bitstream of a video which is generated by a method performed by a video processing apparatus, wherein the method comprises: determining whether to apply a sample-based optical flow coding method based on a condition associated with a target block of the video; and generating a bitstream of the target block based on the determining.

Clause 76. A method for storing bitstream of a video, comprising: determining whether to apply a sample-based optical flow coding method based on a condition associated with a target block of the video; generating a bitstream of the target block based on the determining; and storing the bitstream in a non-transitory computer-readable recording medium.

Clause 77. A non-transitory computer-readable recording medium storing a bitstream of a video which is generated by a method performed by a video processing apparatus, wherein the method comprises: deriving, during a conversion between a target block of a video and a bitstream of the target block, an optical flow of a sub-block outside of a target block of the video; and generating a bitstream of the target block based on the optical flow.

Clause 78. A method for storing bitstream of a video, comprising: deriving, during a conversion between a target block of a video and a bitstream of the target block, an optical flow of a sub-block outside of a target block of the video; generating a bitstream of the target block based on the optical flow; and storing the bitstream in a non-transitory computer-readable recording medium.

Clause 79. A non-transitory computer-readable recording medium storing a bitstream of a video which is generated by a method performed by a video processing apparatus, wherein the method comprises: applying a filtering process on an optical flow field or motion field of a sub-block in an optical flow-based coding method associated a target block of the video; and generating a bitstream of the target block based on the filtering process.

Clause 80. A method for storing bitstream of a video, comprising: applying a filtering process on an optical flow field or motion field of a sub-block in an optical flow-based coding method associated a target block of the video; generating a bitstream of the target block based on the filtering process; and storing the bitstream in a non-transitory computer-readable recording medium.

Example Device

Figure 33:
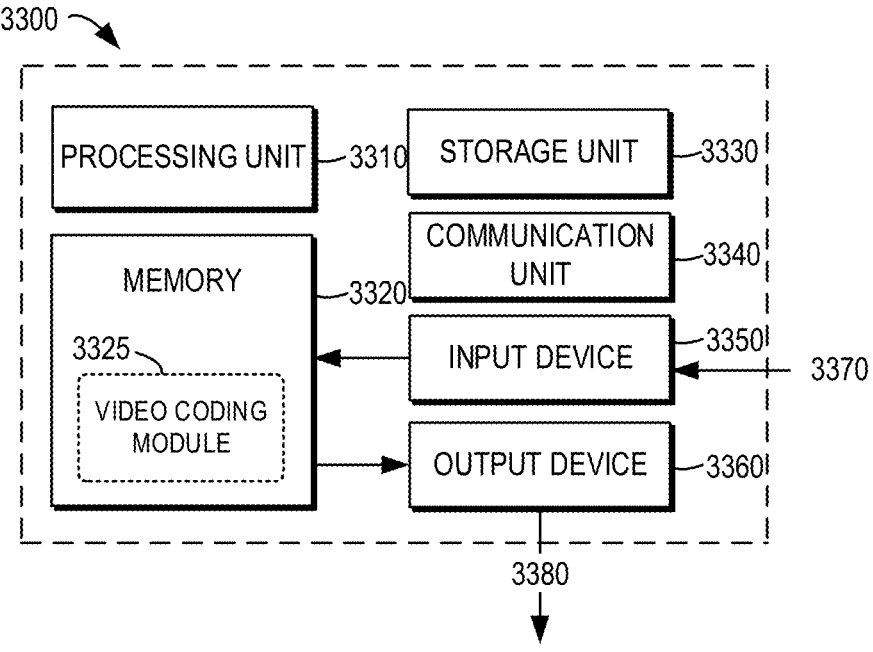
FIG. 33 illustrates a block diagram of a computing device in which various embodiments of the present disclosure can be implemented.

FIG. 33 illustrates a block diagram of a computing device 3300 in which various embodiments of the present disclosure can be implemented. The computing device 3300 may be implemented as or included in the source device 110 (or the video encoder 114 or 200) or the destination device 120 (or the video decoder 124 or 300).

It would be appreciated that the computing device 3300 shown in FIG. 33 is merely for purpose of illustration, without suggesting any limitation to the functions and scopes of the embodiments of the present disclosure in any manner.

As shown in FIG. 33, the computing device 3300 includes a general-purpose computing device 3300. The computing device 3300 may at least comprise one or more processors or processing units 3310, a memory 3320, a storage unit 3330, one or more communication units 3340, one or more input devices 3350, and one or more output devices 3360.

In some embodiments, the computing device 3300 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 3300 can support any type of interface to a user (such as "wearable" circuitry and the like).

The processing unit 3310 may be a physical or virtual processor and can implement various processes based on programs stored in the memory 3320. In a multi-processor system, multiple processing units execute computer executable instructions in parallel so as to improve the parallel processing capability of the computing device 3300. The processing unit 3310 may also be referred to as a central processing unit (CPU), a microprocessor, a controller or a microcontroller.

The computing device 3300 typically includes various computer storage medium. Such medium can be any medium accessible by the computing device 3300, including, but not limited to, volatile and non-volatile medium, or detachable and non-detachable medium. The memory 3320 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 3330 may be any detachable or non-detachable medium and may include a machine-readable medium such as a memory, flash memory drive, magnetic disk or another other media, which can be used for storing information and/or data and can be accessed in the computing device 3300.

The computing device 3300 may further include additional detachable/non-detachable, volatile/non-volatile memory medium. Although not shown in FIG. 33, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 3340 communicates with a further computing device via the communication medium. In addition, the functions of the components in the computing device 3300 can be implemented by a single computing cluster or multiple computing machines that can communicate via communication connections. Therefore, the computing device 3300 can operate in a networked environment using a logical connection with one or more other servers, networked personal computers (PCs) or further general network nodes.

The input device 3350 may be one or more of a variety of input devices, such as a mouse, keyboard, tracking ball, voice-input device, and the like. The output device 3360 may be one or more of a variety of output devices, such as a display, loudspeaker, printer, and the like. By means of the communication unit 3340, the computing device 3300 can further communicate with one or more external devices (not shown) such as the storage devices and display device, with one or more devices enabling the user to interact with the computing device 3300, or any devices (such as a network card, a modem and the like) enabling the computing device 3300 to communicate with one or more other computing devices, if required. Such communication can be performed via input/output (I/O) interfaces (not shown).

In some embodiments, instead of being integrated in a single device, some or all components of the computing device 3300 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 3300 may be used to implement video encoding/decoding in embodiments of the present disclosure. The memory 3320 may include one or more video coding modules 3325 having one or more program instructions. These modules are accessible and executable by the processing unit 3310 to perform the functionalities of the various embodiments described herein.

In the example embodiments of performing video encoding, the input device 3350 may receive video data as an input 3370 to be encoded. The video data may be processed, for example, by the video coding module 3325, to generate an encoded bitstream. The encoded bitstream may be provided via the output device 3360 as an output 3380.

In the example embodiments of performing video decoding, the input device 3350 may receive an encoded bitstream as the input 3370. The encoded bitstream may be processed, for example, by the video coding module 3325, to generate decoded video data. The decoded video data may be provided via the output device 3360 as the output 3380.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method of video processing, comprising:
deriving, during a conversion between a target block of a video and a bitstream of the video, a sample-based optical flow with an affine motion model for each sub-block associated with the target block, and wherein the optical flow of samples at, at least one of a sub-block boundary or a coding block boundary is refined with a weighted averaging of a first optical flow derived from a first affine motion model of a current sub-block and a second optical flow derived from a second affine motion model of neighboring sub-blocks of the current sub-block; and
performing the conversion based on the sample-based optical flow.

2. The method of claim 1, wherein the affine motion model comprises one of:
6-parameter model, or
4-parameter mode.

3. The method of claim 1, wherein the affine motion model is derived with a least square optimization method with temporal predictions and spatial gradients.

4. The method of claim 3, wherein at least a part of samples of a sub-block are used to derive the affine motion model.

5. The method of claim 4, wherein the at least a part of samples of a sub-block are used for a determination of the spatial gradients.

6. The method of claim 1, wherein the affine motion model is derived with an overlapped window covering a current sub-block and a part of neighboring sub-blocks of the current sub-block.

7. The method of claim 6, wherein a size of the overlapped window is indicated in the bitstream, or
wherein the size of the overlapped window is derived on-the-fly, or
wherein the size of the overlapped window is dependent on coding information.

8. The method of claim 7, wherein the size of the overlapped window is dependent on at least one of:
a block size,
a slice type,
a picture type, or
a temporal layer.

9. The method of claim 7, wherein the size of the overlapped window is one of: 2, 4, or 6.

10. The method of claim 1, wherein at least one line of samples at the sub-block boundary is refined.

11. The method of claim 1, wherein the optical flow of samples at a coding block boundary is not refined.

12. The method of claim 1, wherein whether to and/or how to refine the optical flow of samples at a coding block boundary depends on whether a neighbouring block is affine-coded.

13. The method of claim 1, wherein an indication of whether to and/or how to derive the sample-based optical flow is indicated at one of the followings:
a sequence level,
a group of pictures level,
a picture level,
a slice level, or
a tile group level, or
wherein an indication of whether to and/or how to derive the sample-based optical flow is indicated in one of the following:
a sequence header,
a picture header,
a sequence parameter set (SPS),
a video parameter set (VPS),
a dependency parameter set (DPS),
a decoding capability information (DCI),
a picture parameter set (PPS),
an adaptation parameter sets (APS),
a slice header, or
a tile group header, or
wherein an indication of whether to and/or how to derive the sample-based optical flow is included in one of the following:
a prediction block (PB),
a transform block (TB),
a coding block (CB),
a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

14. The method of claim 1, wherein the optical flow of the sub-block outside the target block is repetitively copied from a nearest neighboring sub-block of the sub-block, or wherein the optical flow of the sub-block outside the target block is derived using a motion vector of a current coding block.

15. The method of claim 1, wherein the conversion includes encoding the target block into the bitstream, or wherein the conversion includes decoding the target block from the bitstream.

16. An apparatus for processing video data comprising a processor and a non-transitory memory with instructions thereon, wherein the instructions upon execution by the processor, cause the processor to perform acts comprising:

deriving, during a conversion between a target block of a video and a bitstream of the video, a sample-based optical flow with an affine motion model for each sub-block associated with the target block, and wherein the optical flow of samples at, at least one of a sub-block boundary or a coding block boundary is refined with a weighted averaging of a first optical flow derived from a first affine motion model of a current sub-block and a second optical flow derived from a second affine motion model of neighboring sub-blocks of the current sub-block; and performing the conversion based on the sample-based optical flow.

17. A non-transitory computer-readable storage medium storing instructions that cause a processor to perform acts comprising:

deriving, during a conversion between a target block of a video and a bitstream of the video, a sample-based optical flow with an affine motion model for each sub-block associated with the target block, and wherein the optical flow of samples at, at least one of a sub-block boundary or a coding block boundary is refined with a weighted averaging of a first optical flow derived from a first affine motion model of a current sub-block and a second optical flow derived from a second affine motion model of neighboring sub-blocks of the current sub-block; and performing the conversion based on the sample-based optical flow.

18. A non-transitory computer-readable recording medium storing a bitstream of a video which is generated by a method performed by a video processing apparatus, wherein the method comprises:

deriving a sample-based optical flow with an affine motion model for each sub-block associated with a target block of the video, and wherein the optical flow of samples at, at least one of a sub-block boundary or a coding block boundary is refined with a weighted averaging of a first optical flow derived from a first affine motion model of a current sub-block and a second optical flow derived from a second affine motion model of neighboring sub-blocks of the current sub-block; and generating the bitstream based on the sample based optical flow.

\* \* \* \* \*